US012585763B2

(12) United States Patent
Emerson et al.

(10) Patent No.: US 12,585,763 B2
(45) Date of Patent: *Mar. 24, 2026

(54) DETECTING AND RESPONDING TO ENVIRONMENTAL CONDITION-INDUCED SECURITY ATTACKS ON SEMICONDUCTOR PACKAGES

(71) Applicant: HEWLETT PACKARD ENTERPRISE DEVELOPMENT LP, Spring, TX (US)

(72) Inventors: Theodore F. Emerson, Spring, TX (US); Christopher M. Wesneski, The Colony, TX (US); Daniel J. Zink, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 309 days.

This patent is subject to a terminal disclaimer.

(21) Appl. No.: 18/166,706

(22) Filed: Feb. 9, 2023

(65) Prior Publication Data

US 2024/0111862 A1 Apr. 4, 2024

Related U.S. Application Data

(60) Provisional application No. 63/412,005, filed on Sep. 30, 2022.

(51) Int. Cl.
*G06F 21/55* (2013.01)
*G06F 21/57* (2013.01)

(52) U.S. Cl.
CPC .......... *G06F 21/554* (2013.01); *G06F 21/572* (2013.01); *G06F 21/575* (2013.01); *G06F 21/577* (2013.01); *G06F 2221/034* (2013.01)

(58) Field of Classification Search
CPC .... G06F 21/554; G06F 21/572; G06F 21/575; G06F 21/577; G06F 2221/034
See application file for complete search history.

(56) References Cited

U.S. PATENT DOCUMENTS

| | | | |
|---|---|---|---|
| 9,298,947 B2 | 3/2016 | Dent et al. | |
| 9,459,314 B1 | 10/2016 | Chang | |
| 10,466,275 B1 * | 11/2019 | Vundavalli | .......... G01R 22/066 |
| 10,523,418 B2 | 12/2019 | Hamburg et al. | |

(Continued)

FOREIGN PATENT DOCUMENTS

WO WO2020086087 4/2020

OTHER PUBLICATIONS

Chen et al., "VoltPillager: Hardware-based fault injection attacks against Intel SGX Enclaves using the SVID voltage scaling interface", 30th USENIX Security Symposium, Aug. 11-13, 2021, 19 pages.

(Continued)

*Primary Examiner* — Hee K Song
(74) *Attorney, Agent, or Firm* — Trop, Pruner & Hu, P.C.

(57) ABSTRACT

A process incudes generating, by a canary circuit of a semiconductor package, an output value. The semiconductor package includes a hardware root-of-trust engine for an electronic system. The process includes comparing, by the canary circuit, the output value to an expected value. The process incudes, responsive to a result of the comparison, regulating, by the semiconductor package, a response of the electronic system to a reset request.

23 Claims, 10 Drawing Sheets

(56)                References Cited

U.S. PATENT DOCUMENTS

| | | | |
|---|---|---|---|
| 10,671,763 B2 | 6/2020 | Patki | |
| 10,785,122 B2 | 9/2020 | Inamdar et al. | |
| 10,977,379 B1 | 4/2021 | Williams et al. | |
| 11,212,119 B2 | 12/2021 | Bhandari et al. | |
| 11,256,807 B2 | 2/2022 | Sun et al. | |
| 2012/0131673 A1* | 5/2012 | Caci | G06F 21/86 |
| | | | 726/23 |
| 2017/0085368 A1* | 3/2017 | Saab | H04L 9/003 |
| 2018/0260564 A1 | 9/2018 | Porteboeuf | |
| 2019/0318094 A1 | 10/2019 | Sun et al. | |
| 2020/0322145 A1 | 10/2020 | Sheth et al. | |
| 2020/0322176 A1 | 10/2020 | Bhandari et al. | |
| 2021/0182729 A1 | 6/2021 | George et al. | |
| 2022/0006459 A1* | 1/2022 | Bautista Gabriel | |
| | | | G01R 19/16552 |
| 2022/0292228 A1* | 9/2022 | Johnson | G06F 21/602 |
| 2023/0198754 A1* | 6/2023 | Wu | H04L 9/0631 |
| | | | 380/28 |
| 2024/0111350 A1* | 4/2024 | Herberholz | G01R 31/31725 |
| 2024/0111909 A1* | 4/2024 | Emerson | G06F 21/575 |

OTHER PUBLICATIONS

Colin O'Flynn, "Fault Injection using Crowbars on Embedded Systems", IACR Cryptol, 2016, 12 pages.
Platform Security Architecture Security Model 1.0; psacertified; Document No. DEN 0079; Release No. 3; Date of issue: Feb. 25, 2020; 32 pp.
Buhren, Robert; "One Glitch to Rule Them All: Fault Injection Attacks Against AMD's Secure Encrypted Visualization"; Technische Universitat Berline—SECT; arXiv:2108.04575v4 [cs.CR]; Aug. 26, 2021; 15 pp.

* cited by examiner

START

1000

GENERATE, BY CANARY CIRCUIT OF SEMICONDUCTOR PACKAGE, OUTPUT VALUE, WHERE SEMICONDUCTOR PACKAGE INCLUDES HARDWARE ROOT-OF-TRUST ENGINE FOR ELECTRONIC SYSTEM — 1004

COMPARE, BY CANARY CIRCUIT, OUTPUT VALUE TO EXPECTED VALUE — 1008

RESPONSIVE TO RESULT OF COMPARISON, REGULATE, BY SEMICONDUCTOR PACKAGE, RESPONSE OF ELECTRONIC SYSTEM TO RESET REQUEST — 1012

END

DETECTING AND RESPONDING TO ENVIRONMENTAL CONDITION-INDUCED SECURITY ATTACKS ON SEMICONDUCTOR PACKAGES

BACKGROUND

A computer platform may be subject to a security attack for such purposes as seeking access to information that is stored on the computer platform or harming components of the computer platform. To prevent or at least inhibit the degree of potential harm inflicted by security attacks, the computer platform may have different levels of security protection. For example, the computer platform may have various mechanisms to limit access, such as firewalls, passwords and keys. As another example, the computer platform may have a security processor. The security processor may provide a number of security-related functions to harden the computer platform against security attacks. As an example, a security-related function may be the secure storage of platform secrets. As another example, a security-related function may be the validation of firmware. As another example, a security-related function may be securing firmware updates. As other examples, security-related functions may include cryptographic key generation, sealing cryptographic keys and unsealing cryptographic keys.

DETAILED DESCRIPTION

Figure 1:
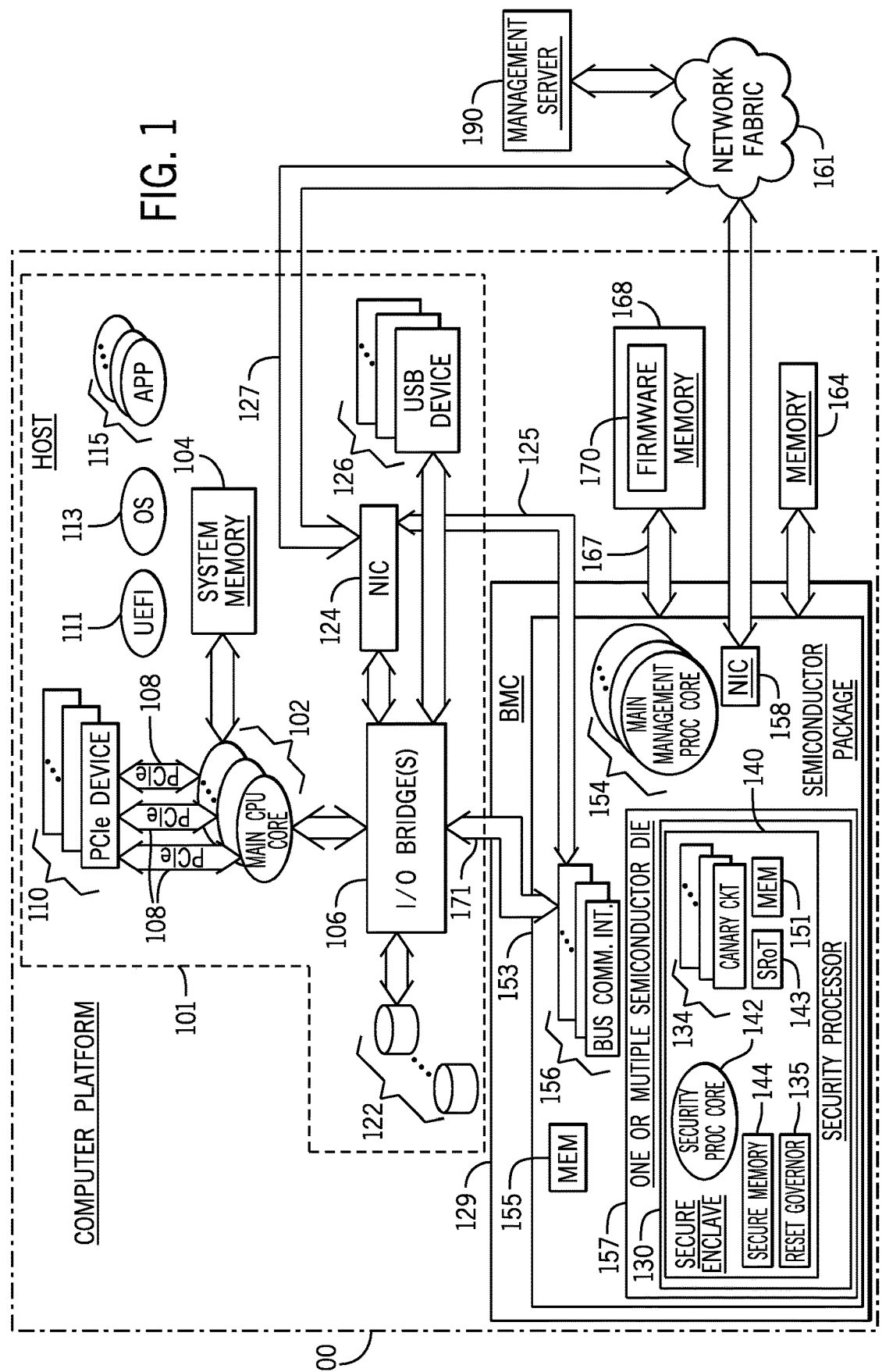
FIG. 1 is a schematic diagram of a computer platform having a digital canary circuit and a reset governor to protect a security processor of the computer platform against environmental condition-induced security attacks according to an example implementation.

A computer platform may include a security processor, which may perform one or multiple security-related services for the computer platform. For example, a security processor may validate firmware instructions as part of the computer platform's secure boot. As a more specific example, a security processor may include a root-of-trust engine to, responsive to the reset or power-up of the computer platform, validate firmware instructions that are associated with a cryptographic chain of trust. As other examples, a security processor may perform one or multiple of the following: store measurement hashes, load reference measurement hashes, store cryptographic keys, retrieve cryptographic keys, generate cryptographic keys, retrieve a cryptographic platform identity, create certificates, store certificates, add certificates, delete certificates, seal cryptographic keys and unseal cryptographic keys.

A potential way to attack a computer platform is to manipulate an environmental condition of the platform's security processor so that the environmental condition is well out-of-range of the security processor's specifications for the condition. In this context, an "environmental condition" of a security processor refers to a parameter or characteristic of the security processor's operating state, which has an expected operating range and which can be influenced by a stimulus that is external to the security processor. As examples, an environmental condition for a security processor may be a magnitude of a supply voltage that is provided to the security processor, a rate of a clock signal that is received by the security processor, a die temperature of the security processor, a radiation level of the security processor, or the strength of an electromagnetic field to which the security processor is exposed. The purposeful manipulation of an environmental condition of a security processor such that the environmental condition is outside of the corresponding expected range is referred to herein as an "environmental condition-induced" security attack.

As an example of an environmental condition-induced security attack, a supply voltage may be provided to a security processor, which is outside of a specified supply voltage range for the security processor. As another example, the rate of a clock signal that is provided to a security processor may be greater than the maximum clock frequency that is specified for the security processor. As another example, the ambient temperature for a security processor may be manipulated (e.g., a fan may be turned off, a heat sink may be removed, thermal energy may be applied to the ambient environment, or another mechanism may be used to increase the ambient temperature) to cause the security processor's die temperature to exceed the maximum die temperature that is specified for the security processor.

The goal of an environmental condition-induced security attack on a security processor is to cause the security processor to malfunction, or incur one or multiple glitches, for purposes of creating an opportunity for an attacker to gain entry into the security processor's otherwise closed system. The malfunctioning may manifest itself in a number of different ways. As examples, the malfunctioning of a security processor may cause bit states to flip; program instructions to become corrupted; program execution behavior to deviate from an expected behavior; execute protected instructions that should not be executed; bypass the execution of instructions that should not be bypassed; bypass firmware validation; or in general, cause the security processor to behave in an abnormal manner. Stated differently, an environmental condition-induced security attack may provide an attack path that circumvents the security processor's safeguards that are otherwise in place when the security processor is functioning properly. Because the nature of an environmental condition-induced security attack is to cause a security processor to operate outside of its design specifications, the exact root cause(s) of the malfunction may not be known and may not be predictable.

In accordance with example implementations, a security processor has one or multiple digital canary circuits to detect an environmental condition-induced security attack on the security processor. As used herein, a "canary circuit" refers to a circuit that malfunctions due to an environment condition-induced security attack and provides an observable indication when the malfunctioning occurs so that the indication may also serve as an indicator of an environmental condition-induced security attack. In accordance with some implementations, a canary circuit performs one or multiple cryptographic cipher transforms that produce an output based on a known input, and the output may be used as an indicator. In this manner, a deviation of the output of the canary circuit from an expected output indicates a malfunction and indicates an environmental condition-induced security attack.

The canary circuit may have relatively complex logic (e.g., a chain of serially-coupled Advanced Encryption Standard (AES) cipher transforms) that is designed to malfunction before, at or near the same time that a protected component (e.g., a root-of-trust engine or security processing core) of the security processor malfunctions due to an environmental condition-induced attack. In accordance with example implementations, the digital canary circuit provides a tampering indication responsive to an output value that is produced by its complex logic not matching an expected value. As described herein, for purposes of ensuring that the digital canary circuit experiences a similar environment as the component to be protected, logic gates of the canary circuit are spatially commingled with the logic gates of the component to be protected. As described further herein, the canary circuit's acute sensitivity to an environmental condition-induced security attack allows responsive actions to be taken in a timely manner.

Subjecting a security processor to an environmental condition-induced security attack, in conjunction with repeatedly resetting the security processor, may enhance the likelihood that the security attack succeeds. For example, the security processor may be part of a computer platform that has a secure boot for purposes of ensuring that authenticated firmware and software execute on the computer platform. The secure boot involves the computer platform establishing a cryptographic chain of trust for the machine-readable instructions (e.g., a firmware and software) that are executed by the computer platform. The chain of trust may begin with an initial link, or trust anchor, which is the initial link, or beginning, of the chain of trust. In general, the secure boot involves each set of machine-readable instructions corresponding to each link of the chain of trust being deemed trustworthy and then loaded and executed to verify that the next set of machine-readable instructions corresponding to the next successor link is trustworthy before the next set is allowed to load and execute.

Because a security processor may play a role in establishing a chain of trust for a computer platform when component(s) of the security processor are released from reset, each reset of the security processor is another opportunity for an induced malfunction of the security processor to advantageously benefit an attacker. For example, the security processor may contain one or multiple components that establish one or multiple links of a cryptographic chain of trust, and the malfunction of one or multiple such components may present attack paths.

As a more specific example, a security processor may contain a root-of-trust engine that establishes a trust anchor for a computer platform's chain of trust when the root-of-trust engine is released from reset. By causing the security processor to malfunction at or near the time that the root-of-trust engine is released from reset, the malfunction may, for example, cause a malicious set of initial firmware instructions to be erroneously authenticated (i.e., incorrectly deemed trustworthy). As another example, firmware that is executed by a processing core of a security processor may be trustworthy, but the processing core, after being released from reset, may erroneously authenticate a malicious set of firmware instructions corresponding to the next link of the chain of trust. As another example, the initial set of firmware may be trustworthy, but the processing core, after being released from reset, may fail to correctly perform initial fault and/or security checks or in general, may exhibit unexpected execution behavior.

In accordance with example implementations that are described herein, a semiconductor package has a reset governor to control, or regulate, a reset response of a system. Here, regulating the reset response of a system may refer to regulating a reset response of the entire system or regulating a reset response of a particular component or subsystem of the entire system. As an example, in accordance with some implementations, regulating the reset response of a system may include regulating a reset response of a semiconductor package that contains a reset governor. As another example, in accordance with example implementations, regulating a reset response of a system may include regulating a reset response of a subsystem (e.g., a management subsystem) or a component (e.g., a management controller) that contains a reset governor (e.g., contains a semiconductor package that contains a reset governor). As another example, in accordance with some implementations, regulating a reset response of a system may include regulating a reset response of a computer platform (e.g., power cycling the computer platform) that contains a reset governor (e.g., contains a semiconductor package that includes a reset governor). In accordance with example implementations, controlling, or regulating, the "reset response" of a system refers to a reset governor controlling, or regulating, the time that a component subsystem or system is held in reset after being placed in reset. Stated differently, in accordance with example implementations, the reset governor controls, or regulates, a "reset hold time," which is the continuous time between the time that the reset begins and the time that the reset ends (also called the release of the reset). Although specific examples are described herein for controlling, or regulating, the reset response of a semiconductor package that contains a reset governor, it is understood that, in accordance with further example implementations, regulating the reset response may extend beyond a semiconductor package containing a reset governor, in accordance with further implementations.

The reset governor's controlling of the reset hold time may be used to effectively throttle, or limit, the time rate at which the semiconductor package may be reset. This throttling may be imposed and/or increased when tampering with the semiconductor package is detected.

In general, the reset governor controls the response of the semiconductor package to a "reset request." In this context, a "reset request" refers to an indication that is provided or generated for the purpose of causing one or multiple components of the semiconductor package to be reset. As an example, a reset request may be provided by asserting an electrical reset signal. Many different components, both internal to the semiconductor package and external to the semiconductor package, may cause the assertion of the reset signal. As an example, a power monitoring circuit outside the semiconductor package may assert the reset signal. As another example, an internal watchdog timer of the semiconductor package may assert the reset signal in response to the timer timing out. As another example, an internal circuit may assert the reset signal responsive to a particular bit in a control register being written.

The reset signal may have a first state (e.g., an asserted state, such as a logic zero state) for the purpose of placing the semiconductor package in reset (or requesting the initiation of the reset) and a second state (e.g., a de-asserted state, such as a logic one state) for purposes of releasing the semiconductor package from the reset. In accordance with example implementations, the reset governor receives an input reset signal (e.g., the reset signal that is asserted to provide the reset request) and provides an output reset signal to the reset term inal(s) of one or multiple components of the semiconductor package. The reset governor regulates the reset hold time, which is the delay between the time that the reset governor asserts the output reset signal (to begin the reset) and the time that the output reset signal deasserts the output reset signal (to release the reset).

In accordance with example implementations, the reset governor may regulate the reset hold time independently of the reset hold time that may be indicated by the input reset signal. Stated differently, in accordance with example implementations, although the reset governor may begin the reset responsive to the assertion of the input reset signal, the reset governor's release of the reset may be independent of the time that the input reset signal is deasserted.

In accordance with example implementations, the reset governor regulates the reset hold time (i.e., regulates the reset response time of the semiconductor package) based on whether or not any of the canary circuits of the semiconductor package have detected tampering activity. For example, in accordance with example implementations, the reset governor may initially impose a first smaller reset hold time (e.g., impose a reset hold time commensurate with the reset hold time of the input reset signal or impose a predefined minimum reset hold time), and the reset governor may increase the reset hold time responsive to a canary circuit indicating the detection of tampering activity.

In accordance with example implementations, the reset governor may regulate the reset hold time in response to the detection of tampering activity other than the detection of an environmental condition-induced security attack by a canary circuit. In this context, the detection of "tampering activity" refers to the detection, or identification, of a signature of one or multiple events, where this signature is consistent with a signature (a time pattern of events, an attribute of an event, a particular sequence of events) of a security attack.

As examples of tampering activity other than an environmental condition-induced security attack, tampering activity may be detected due to a switch sensor indicating that the computer platform (e.g., a blade server) has been removed from an enclosure (e.g., a rack) or a switch sensor indicating that a chassis cover of the computer platform has been opened. As other examples, tampering activity may be detected responsive to the detection of a magnitude of a supply voltage deviating from a specified range, an input clock rate deviating from a specified range, or a die temperature deviating from a specified range.

The semiconductor package may, in response to tampering activity being detected, initiate and/or perform one or multiple actions, that may extend beyond changing the package's reset response, for purposes of countering, reporting and/or mitigating the detected tampering activity. As an example, a power down of the semiconductor package may be initiated in response to tampering activity being detected. As another example, the semiconductor package may log the detection of tampering activity. As another example, the semiconductor package may send or initiate the sending of an alert (e.g., the sending of a message or other notification to a system administrator) responsive to the detected tampering activity. As another example, the semiconductor package may erase secrets that are stored in a secure memory responsive to tampering activity being detected.

Referring to FIG. 1, as a more specific example, in accordance with some implementations, a computer platform 100 includes a semiconductor package 153 that includes one or multiple digital canary circuits 134 (called "canary circuits 134" herein) and a reset governor 135. As described herein, in accordance with example implementations, the canary circuits 134 may be placed near or integrated with components of the security processor 130 to be protected against environmental condition-induced security attacks. As examples, these components may include a silicon root-of-trust SRoT engine 143, a security processing core 142 and/or any other component of the security processor 130. The reset governor 135 controls, or regulates, a reset response of the security processor 130 and the reset governor 135, in accordance with example implementations, modifies the reset response responsive to tampering activity being detected, such as tampering activity being detected by a canary circuit 134. In accordance with example implementations, the reset governor 135 regulates a reset hold time for the semiconductor package 153 responsive to whether tampering activity with the semiconductor package 153 has been detected.

The semiconductor package 153 may be any of a number of different semiconductor packages, such as a surface mount package, a through-hole package, a ball-grid array package, a small outline package, a chip-scale package, or any other container for a semiconductor die. In accordance with some implementations, the semiconductor package 153 may have a single semiconductor die 157, and in accordance with further example implementations, the semiconductor package 153 may have multiple semiconductor die 157.

In addition to tampering activity being detected by a canary circuit 134, tampering activity may be detected by a dedicated tampering detection circuit (e.g., tampering detection circuit 234, described below in connection with FIG. 2) of the semiconductor package, in accordance with some implementations. Moreover, in accordance with some implementations, tampering activity may be detected by the reset governor 135. For example, in accordance with example implementations, the reset governor 135 monitors a time pattern of reset requests for the semiconductor package 153 for purposes of determining whether the time rate of the request resets exceeds a predefined threshold (which indicates detecting tampering activity). The semiconductor package 153, in accordance with example implementations, may, responsive to tampering activity being detected, initiate and/or perform one or multiple responsive actions to counter the tampering activity, report the tampering activity and/or mitigate the effects resulting from the tampering activity.

The reset governor 135 and canary circuit(s) 134 may be part of any of a number of different semiconductor packages, depending on the particular implementation. As one example, as depicted in FIG. 1, the semiconductor package 153 may contain a security processor 130, and a reset governor 135 and one or multiple canary circuits 134 may be part of the security processor 130. As an example, the security processor 130 may be fabricated on one or multiple semiconductor die 157 of the semiconductor package 153. In the context used herein, a "security processor" refers to a hardware component of an electronic device, such as the computer platform 100, which performs one or multiple security-related services for the electronic device.

In accordance with further implementations, a semiconductor package may contain a reset governor 135 and one or multiple canary circuits 134; but the semiconductor package may not include a security processor. For example, in accordance with some implementations, a central processing unit (CPU) semiconductor package (or "socket") may include a reset governor 135, one or multiple canary circuits 134, and one or multiple processing cores (e.g., CPU cores, such as cores 154 of a baseboard management controller (BMC) 129, further described herein), and the CPU semiconductor package may not include a security processor. As another example, in accordance with further implementations, a semiconductor package may include a reset governor 135 and one or multiple canary circuits 134, and the semiconductor package not include any processing cores or any security processor.

The security processor 130 may have any of a number of different forms, depending on the particular implementation. For example, in accordance with some implementations, the security processor 130 may correspond to a standalone security-specific semiconductor package, which contains a hardware root-of-trust, validates a firmware image for a computer platform and controls the boot of the computer platform based on a result of this validation. As another example, in accordance with some implementations, the security processor 130 may be a trusted platform module (TPM). As another example, in accordance with some implementations, the security processor 130 may be a co-processor of a multiple CPU core, CPU semiconductor package (or "socket").

For the example implementation that is depicted in FIG. 1, the security processor 130 is part of a management controller, such as a BMC 129. In accordance with some implementations, the security processor 130 and the BMC 129 may be fabricated on the same semiconductor die 157. In accordance with further example implementations, the security processor 130 and the BMC 129 may be fabricated on respective semiconductor dies 157.

In the context used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. A baseboard management controller may be located on the motherboard or main circuit board of the server or other device to be monitored.

The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

The computer platform 100, in accordance with example implementations, is a modular unit, which includes a frame, or chassis. Moreover, this modular unit may include hardware that is mounted to the chassis and is capable of executing machine-readable instructions. A blade server is an example of the computer platform 100, in accordance with some implementations. The computer platform 100 may have a number of different other forms, in accordance with further implementations, such as a rack-mounted server, standalone server, a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, or, in general, any other processor-based platform.

In accordance with example implementations, the computer platform 100 may be connected to a network fabric 161. The network fabric 161 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

In accordance with example implementations, the BMC 129 may execute a set of firmware instructions, called a "firmware management stack," for purposes of performing a variety of management-related functions for a host 101 of the computer platform 100. As examples, the BMC 129 may provide such management-related functions as operating system runtime services; resource detection and initialization; and pre-operating system services. The management-related functions may also include remote management functions. As examples, the remote management functions may include keyboard video mouse (KVM) functions; virtual power functions (e.g., remotely activated functions to remotely set a power state, such as a power conservation state, a power on, a reset state or a power off state); virtual media management functions; and one or multiple other management-related functions for the host 101.

A "host" (or "host instance") is associated with an operating system 113 instance (e.g., a Linux or Windows operating system instance) and is provided by a corresponding set of resources of the computer platform 100. For the example implementation that is depicted in FIG. 1, the resources for a host 101 may include one or multiple main CPU cores 102 (e.g., CPU processing cores, semiconductor containing CPU processor cores) and memory devices that are connected to the CPU core(s) 102 to form a system memory 104. The CPU core(s) 102 may be coupled to one or multiple input/output (I/O) bridges 106, which allow communications between the CPU core(s) 102 and the BMC 129, as well as communications with various I/O devices, such as storage drives 122; one or multiple network interface controllers (NICs) 124; one or multiple Universal Serial Bus (USB) devices 126; I/O devices; a video controller; and so forth. Moreover, as also depicted in FIG. 1, the computer platform 100 may include one or multiple Peripheral Component Interconnect Express (PCIe) devices 110 (e.g., PCIe expansion cards) that may be coupled to the CPU core(s) 102 through corresponding individual PCIe bus(es) 108. In accordance with a further example implementation, the PCIe device(s) 110 may be coupled to the I/O bridge(s) 106, instead of being coupled to the CPU core(s) 102. In accordance with yet further implementations, the I/O bridge(s) 106 and PCIe interfaces may be part of the CPU core(s) 102.

In accordance with some implementations, the computer platform 100 may contain multiple hosts 101 (e.g., each host 101 may correspond to an associated CPU multi-core package (or "socket")). The BMC 129 may provide management-related services and security-related services for each host 101.

In general, the memory devices that form the system memory 104, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with some implementations, one or multiple NICs 124 may be intelligent input/output peripherals, or "smart I/O peripherals," which may provide backend I/O services for one or multiple applications 115 (or application instances) that execute on the computer platform 100. In accordance with some implementations, one or multiple of the PCIe devices 110 may be smart I/O peripherals.

In accordance with example implementations, the BMC 129 includes one or multiple main management processing cores 154 (called "main processing cores 154" herein) that execute machine-readable instructions to perform management functions for a host 101 as part of the BMC's management plane. These instructions may correspond to a firmware management stack of the BMC 129. The main processing core(s) 154 execute the firmware management stack to allow the BMC 129 to perform a variety of management roles for the host 101, such as monitoring sensors; monitoring operating system status; monitoring power statuses; logging computer system events; providing a remote console; providing remotely-controlled functions and other virtual presence technologies; and other management activities. In accordance with example implementations, the BMC 129 may communicate with a remote management server 190 via a NIC 158 of the BMC 129.

In accordance with further implementations, the BMC 129 may communicate with the remote management server

190 via a NIC 124. For example, in accordance with some implementations, via a bus communication interface 156, the BMC 129 may communicate through a sideband bus 125 (e.g., a bus corresponding to a Network Controller Sideband Interface (NC-SI) electrical interface and protocol defined by the Distributed Management Task Force (DMTF)) with the NIC 124. As depicted at reference numeral 127, the NIC 124 may be coupled to the network fabric 161.

In addition to providing management functions for the host(s) 101, the BMC 129 may provide security-related features that protect the host(s) 101 against security attacks. More specifically, in accordance with example implementations, the BMC's security plane includes a secure enclave 140. In this context, a "secure enclave" refers to a subsystem of the BMC 129 for which access into and out of the subsystem is tightly controlled. As further described herein, in accordance with example implementations, among its other features, the secure enclave 140 may include the reset governor 135; one or multiple canary circuits 134; a secure memory 144; and the security processing core 142.

In accordance with example implementations, the secure enclave 140 performs cryptographic functions for the host(s) 101 and is fully disposed inside a cryptographic boundary. A "cryptographic boundary" in this context refers to a continuous boundary, or perimeter, which contains the logical and physical components of a cryptographic subsystem, such as BMC components that form the secure enclave 140.

The secure enclave 140 of the BMC 129, in accordance with example implementations, is isolated from the BMC's management plane (and other non-secure components of the BMC 129, which are outside of the secure enclave 140). In accordance with example implementations, the secure enclave 140 includes a hardware, or silicon, RoT (called an "SRoT" herein), which may be provided via the SRoT engine 143.

More specifically, in accordance with example implementations, the secure enclave 140 stores an immutable fingerprint, which is used by the SRoT engine 143 to validate an initial portion of firmware 170 (i.e., verify the trustworthiness of the initial portion) before this initial portion of firmware 170 is executed. In accordance with example implementations, the SRoT engine 143 holds the security processing core 142, the management processing cores 154 and the main CPU cores 102 in reset until the SRoT engine 143 validates the initial portion of the firmware 170. Responsive to the power on/reset, the SRoT engine 143 validates and then loads an initial portion of the firmware 170 into a memory 151 of the secure enclave 140 so that this firmware portion is now trusted. The SRoT engine 143 then releases the security processing core 142 from reset to allow the security processing core 142 to boot and execute the loaded firmware instructions.

By executing the firmware instructions, the security processing core 142 may then validate another portion of the firmware 170 that corresponds to a portion of the BMC's management firmware stack and after validation, load this portion of the firmware stack into a memory 155 of the BMC 129. The portion of the management firmware stack may then be executed by the BMC's main processing core(s) 154 (when released from reset), which causes the main processing core(s) 154 to load additional portions of the firmware 170 and place the loaded portions into a memory 164. Access to the memory 164 may involve additional training and initialization steps (e.g., training and initialization steps set forth by the DDR4 specification). Those instructions may be executed from the validated portion of the BMC's firmware management stack in the memory 155. In accordance with example implementations, the secure enclave 140 may lock the memory 155 to prevent modification or tampering with the validated firmware portion(s) that are stored in the memory 155.

Therefore, in accordance with example implementations, a cryptographic chain of trust, which is anchored by the BMC's SRoT, may be extended from the SRoT to the firmware management stack that is executed by the BMC's main processing cores 154. Moreover, in accordance with example implementations, the firmware management stack that is executed by the main processing core(s) 154 may validate host system firmware, such as Unified Extensible Firmware Interface (UEFI) 111 firmware, thereby extending the chain of trust to the host system firmware. In accordance with example implementations, the UEFI firmware 111 is served through the bus fabric from firmware 170.

In accordance with example implementations, the BMC 129 is constructed to prevent a given domain or entity of the BMC 129 from powering up or coming out of reset until the secure enclave 140 validates the domain/entity. Moreover, in accordance with example implementations, the BMC 129 may prevent components of the BMC 129 from accessing resources of the BMC 129 and resources of the computer platform 100 until the secure enclave 140 approves/validates the resources. The BMC 129 may perform bus filtering and monitoring (e.g., bus filtering and monitoring for a Serial Peripheral Interface (SPI) bus, a system management bus (SMB), an Inter-Integrated Component (I²C) bus, an Improved I²C (I³C) bus, and so forth) to prevent unwanted access to bus devices. For example, the BMC 129 may perform bus filtering and monitoring for a bus 167 (e.g., a SPI bus) that is coupled to a non-volatile memory 168 that stores the firmware 170.

In accordance with example implementations, the reset governor 135 may be fabricated on the same semiconductor die 157 as the secure enclave 140. As described herein, in accordance with example implementations, although the security processor 130 has a staged reset in that the security processing core 142 and the SRoT engine 143 are placed in reset at the same time, the security processing core 142 and the SRoT engine 143 are released from reset at different times. In this manner, in accordance with example implementations, the SRoT engine 143 is first released from reset (while the security processing core 142 remains held in reset) to validate the initial part of the firmware 170. In accordance with example implementations, the SRoT engine 143 releases the security processing core 142 from reset after the SRoT engine validates and then loads the initial part of the firmware 170 into the memory 151 for the processing core's execution. In accordance with example implementations, the reset hold time (which is regulated by the reset governor 135) controls the time that the SRoT engine 143 remains held in reset. By imposing a controllable reset hold time for the reset state, the reset governor 135 may throttle, or limit, reset requests to impose a limit on the rate at which the security processor 130 may be reset. In accordance with example implementations, all of the components of the computer platform 100 (i.e., the BMC 129, the security processing core 142 and the SRoT engine 143) may be simultaneously placed in reset at the same time.

In accordance with some implementations, the reset governor 135 regulates the duration of the reset hold time based on whether or not tampering activity has been detected. For example, the reset governor 135, in accordance with example implementations, may impose a first, smaller reset hold time when a tampering detection history (e.g., a history represented by non-volatile memory bit(s)) indicates no previous tampering detection, and the reset governor 135 may increase the reset hold time responsive to tampering activity being detected. In accordance with some implementations, an indication of tampering activity may be the result of a sensor of a tamper detection circuit of the security processor 130 detecting an environmental condition (e.g., the rate exceeding a threshold that defines a supply voltage, a clock rate or a die temperature) varying beyond a specified range for the environmental condition. In accordance with example implementations, a canary circuit 134 of the security processor 130 may detect an environmental condition-induced security attack and provide a corresponding tampering detection indication.

In accordance with some implementations, the reset governor 135 may detect tampering activity based on the time pattern of reset requests that are provided to the security processor 130. For example, in accordance with some implementations, the reset governor 135 may detect tampering activity responsive to a rate of the reset requests exceeding a predefined rate threshold (e.g., the rate exceeding a threshold that defines a maximum number N of reset requests within a T period of time).

Figure 2:
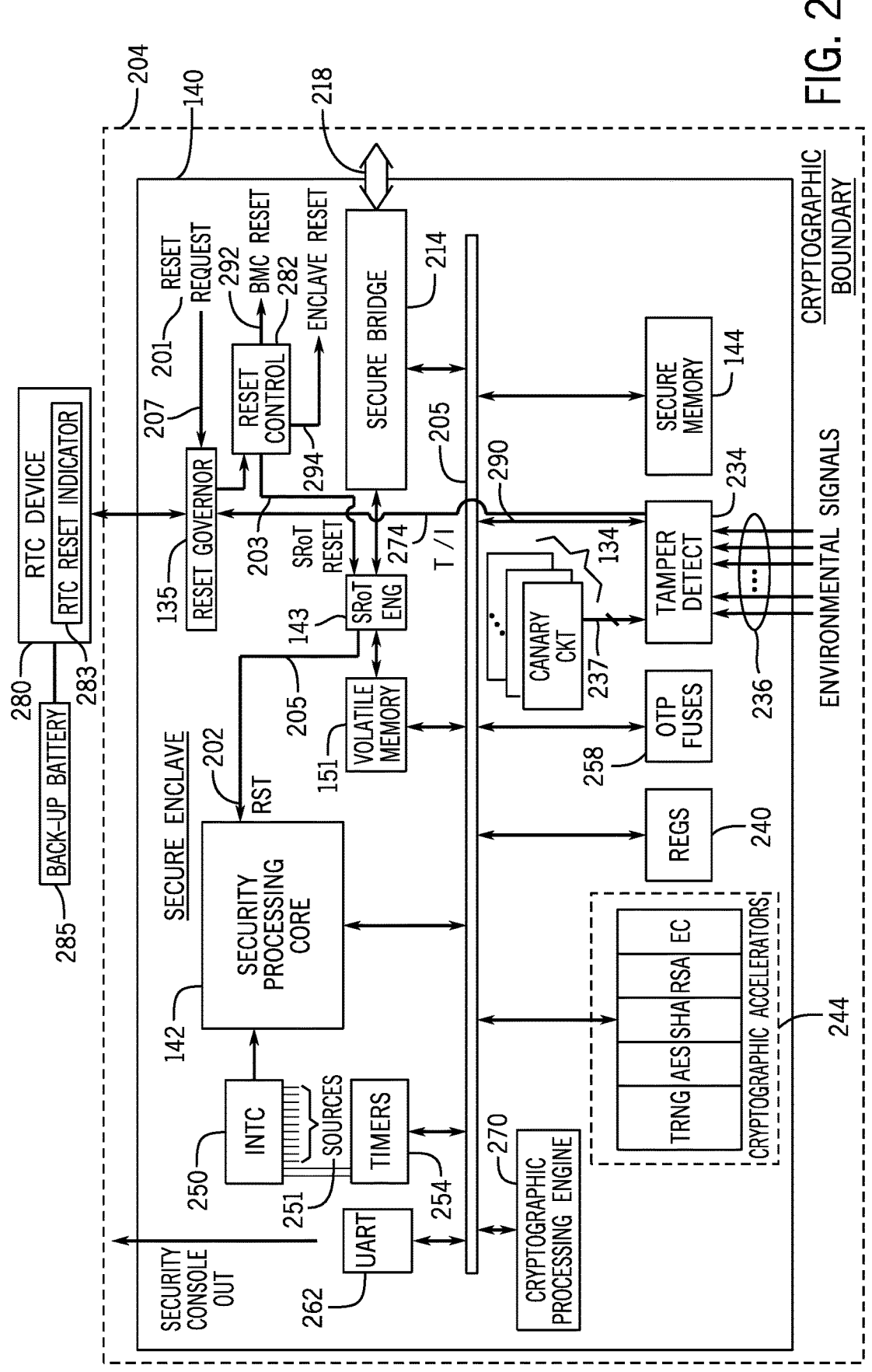
FIG. 2 is a schematic diagram of a secure enclave of the security processor according to an example implementation.

Referring to FIG. 2, in accordance with example implementations, the BMC 129 may be a complete system-on-chip (SOC), and the secure enclave 140 may be contained within a tightly-controlled cryptographic boundary 204. In general, the components of the secure enclave 140 may communicate using a bus infrastructure 205. In accordance with example implementations, the bus infrastructure 205 may include such features as a data bus, a control bus, an address bus, a system bus, one or multiple buses, one or multiple bridges, and so forth.

The volatile memory 151 may be, for example, a static random access memory (SRAM) and may store data representing trusted computing base (TCB) measurements, such as one or multiple PCR banks. The secure memory 144 may be, for example, a non-volatile RAM (NVRAM). The secure enclave 140 may include registers 240. The registers 240 may be software registers, hardware registers, or a combination of hardware and software registers, depending on the particular implementation. For example, in accordance with some implementations, the registers 240 include cryptographically secure registers, such as software PCRs. Moreover, in accordance with example implementations, the registers 240 may include operational registers, such as hardware registers that provide control, status and configuration functions for the secure enclave 140.

The secure enclave 140, in accordance with example implementations, includes a secure bridge 214 that, via a secure interconnect 218, controls access to the secure enclave 140 (i.e., establishes a fire wall for the secure enclave 140). As examples, the interconnect 218 may include a bus or an internal interconnect fabric, such as Advanced Microcontroller Bus Architecture (AMBA) fabric or Advanced eXtensible Interface (AXI) fabric. As an example, in accordance with some implementations, the interconnect 218 may include a SPI bus controller to couple one or multiple SPI devices to the secure enclave 140. The secure bridge 214 may provide an additional upstream interface to allow the secure enclave 140 to "reach out" to the interconnect 218. The secure enclave 140 may use the upstream interface to obtain its firmware and, in general, to validate the firmware 170 (FIG. 1). The secure bridge 214 may employ filtering and monitoring on the interconnect 218 to prevent unauthorized access to the memory 151. In accordance with example implementations, the management plane of the BMC 129 may communicate with the secure enclave 140 via the execution of one or multiple security service application programming interfaces (APIs).

As also depicted in FIG. 2, in accordance with example implementations, the secure enclave 140 may include a tampering detection circuit 234. The tampering detection circuit 234, in accordance with example implementations, receives one or multiple environmental signals 236 (e.g., sensor signals representing a die temperature, a clock rate, a supply voltage magnitude, an enclosure opening status, a removal status, and so forth), which the tampering detection circuit 234 may use to detect tampering. For example, the tampering detection circuit 234 may compare a value (e.g., a supply voltage) represented by a particular environmental signal 236 to a threshold (e.g., an upper supply voltage threshold or a lower supply voltage threshold defining a predefined supply voltage range) to determine whether tampering activity is detected. As another example, the tampering detection circuit 234 may determine whether a particular environmental signal 236 (e.g., a switch status representing whether a chassis cover has been opened) has a state that represents that a cover to the computer platform 100 has been opened.

The tampering detection circuit 234, in accordance with example implementations, may monitor tampering indication signals 237 that are provided by canary circuits 134 of the secure enclave 140 for purposes of determining whether environmental condition-induced tampering activity has been detected by any of the canary circuits 134. Moreover, in accordance with some implementations, the tampering detection circuit 234 may, via one or multiple communication lines 274, receive an indication of detected tampering activity from the reset governor 135 (e.g., an indication that the reset governor 135 detected that the time rate of reset requests exceeds a predefined rate threshold).

In accordance with some implementations, the tampering detection circuit 234 may monitor a reset indicator 283 (e.g., a bit stored in a non-volatile memory) that is associated with a real time clock (RTC) device 280 for purposes of detecting tampering activity associated with the RTC device 280. In accordance with example implementations, the reset governor 135 may include a controller, which is coupled to the tampering detection circuit 234, and the reset indicator 283 is coupled to the controller inside the reset governor 135. In this manner, as further described herein, in accordance with example implementations, the RTC device 280 may be used by the reset governor 135 to measure the reset hold time. The RTC device 280 may be coupled to a back-up battery 285 (e.g., a "coin" battery), and if the back-up battery 285 is removed, volatile memories of the RTC device 280 may be erased, thereby resetting the RTC device 280.

Because a primary way to issue repeated resets may be to power cycle the secure enclave 140 (and possibly the BMC and/or the computer platform), and because logic of the secure enclave 140, such as the reset governor 135 may be volatile, power cycling may otherwise be a way to potentially circumvent the reset hold regulation by the governor 135. In accordance with example implementations, to prevent such a bypass of the reset governor's reset hold regulation, a non-volatile time reference that is provided by the RTC device 280 between system power cycles may be used. In this manner, if the battery to the RTC device 280 is disconnected, a "loss of battery" indication informs the reset governor 135 to hold the first reset for a predetermined time period, which may be the maximum hold time interval that is imposed by the reset governor 135. For example, in accordance with some implementations, the reset governor 135 may use an alarm timer of the RTC device 280 so that the RTC device 280 generates an indication (e.g., asserts an interrupt signal) when the timer reaches a time that the reset governor 135 writes to a register of the RTC device 280. The reset governor 135 may use the indication that is provided by the RTC device 280 to trigger the release of a reset (i.e., to set the duration of the reset hold time). When the RTC device 280 is reset, however, the reset hold time may also be effectively reset to thereby defeat the imposition of a longer reset hold time, which may benefit an attacker.

In accordance with example implementations, removal of the back-up battery 285 may be detected, and responsive to this detection, the state of the reset indicator 283 may be set to a value to represent that the RTC device 280 has been reset. More specifically, in accordance with some implementations, the back-up battery 285 makes the RTC device 280 non-volatile. The battery removal condition is created by the loss of the volatile "time is OK and valid" indicator. In accordance with some implementations, the RTC device 280 may detect its reset and set the reset indicator 283 to indicate the reset. In accordance with further implementations, the tampering detection circuit 234 may control the setting of the reset indicator 283. It is noted that although FIG. 2 depicts the RTC device 280 outside of the secure enclave 140, in accordance with further implementations, the RTC device 280 may be part of the secure enclave 140. In accordance with some implementations, the RTC device 280 may be one of a set of timers 254 of the secure enclave 140 or part of the BMC 129.

In accordance with example implementations, when tampering is detected by the tampering detection circuit 234, the tampering detection circuit 234 may initiate and/or perform one or multiple actions to respond to the detected tampering activity. For example, the tampering detection circuit 234 may communicate with the bus infrastructure 205, via communication lines 290, for purposes of initiating one or multiple responsive actions to counter the tampering activity, report the tampering activity and/or mitigate the effects of the tampering activity. As another example, the tampering detection circuit 234 may communicate, via one or multiple communication lines 274, with the reset governor 135 for purposes of causing the reset governor 135 to increase the reset hold time. As another example, the tampering detection circuit 234 may cause the secure enclave 140 to remove sensitive information (e.g., erase certain secrets that are stored in the secure memory 144); assert a signal or message to alert an external component (e.g., a main processing core 154, the operating system 113 (FIG. 1), the remote management server 190 (FIG. 1), or another entity) to the tampering activity; reset the main processing core(s) 154; or perform one or multiple other responsive actions to counter the tampering activity, report the tampering activity and/or mitigate the effects of the tampering activity.

In accordance with some implementations, the reset governor 135 may be coupled to a reset control circuit 282, which generates one or multiple reset signals (to initiate corresponding resets) to one or multiple corresponding circuits of the computer platform in response to an input reset signal that is received by the reset governor 135. The output 282 may be coupled to a reset terminal 203 of the SRoT engine 143 so that the reset governor 135 may assert an output reset signal to place the SRoT engine 143 in reset and deassert the output reset signal to release the SRoT engine 143 from reset.

As depicted in FIG. 2, in accordance with example implementations, the reset governor 135 includes an input 207 that receives an input reset signal, which may indicate a reset request 201. A particular reset request 201 may be generated, for example, by asserting (e.g., driving to a logic zero level) the input reset signal. In accordance with example implementations, the reset governor 135, responsive to the assertion of the input reset signal, may cause the reset control circuit 282 to generate corresponding reset signals for the BMC, secure enclave and SRoT engine 143 on reset lines 292, 294 and 203, respectively. Without the presence of the reset governor 135 (i.e., if the input and output reset signals are the same), the deassertion of the input reset signal (e.g., the allowing of the input reset signal to return to a logic one level) releases the SRoT engine 143 from reset. The SRoT engine 143 may, in accordance with example implementations, provide a signal indicating the successful validation of firmware (e.g., firmware 170 of FIG. 1) to allow the secure enclave 140 and potentially other components to come out of reset.

In accordance with some implementations, if no tampering activity has been detected, the reset governor 135 releases the reset (e.g., releases the reset of the SRoT engine 143, BMC and/or computer platform), such as by deasserting the output reset signal, when the input reset signal is deasserted, or in a relatively short time thereafter. However, in accordance with example implementations, if tampering activity has been detected, the reset governor 135 imposes a relatively longer delay in releasing the SRoT engine 143 from reset (e.g., the reset governor 135 imposes a longer reset hold time).

Among its other features, in accordance with some implementations, as depicted in FIG. 2, the secure enclave 140 may include a cryptographic processing engine 270 that encrypts data written to the secure memory 144 and decrypts data read from the secure memory 144. Depending on the particular implementation, the encryption and decryption may use an Advanced Encryption Standard-XOR-Encrypt-XOR-Based Tweaked-Codebook Mode with Ciphertext Stealing (or "AES-XTS") block cipher, or another block cipher. In accordance with further implementations, the encryption and/or decryption may be performed by the security processing core 142.

The secure enclave 140, in accordance with example implementations, may include cryptographic accelerators 244, such as symmetric and asymmetric cryptographic accelerators, which assist the security processing core 142 with such operations as key generation, signature validation, encryption, decryption and so forth. Moreover, the cryptographic accelerators 244 may include a true random number generator to provide a trusted entropy source for cryptographic operations.

In accordance with example implementations, the secure enclave 140 may include one-time programmable (OTP) fuses 258 that store data that represents truly immutable attributes. For example, in accordance with some implementations, the fuses 258 may store data that represents a master secret, from which other private keys and secrets may be derived. As another example, in accordance with some implementations, the fuses 258 may store a silicon root-of-trust Secure Hash Algorithm 2 (SHA-2) signature (e.g., the immutable fingerprint used by the SRoT engine 143). As another example, in accordance with some implementations, the fuses 258 may store a unique identifier (e.g., an identifier used to seed a platform identity certificate). In accordance with further example implementations, the fuses 258 may store data that represents a security enablement fingerprint. The secure enclave 140 may have other components that, as can be appreciated by one of ordinary skill in the art, may be present in a processor-based architecture, such as a timer 254, an interrupt controller 250 (that receives interrupt triggering stimuli from the timers 254 and other sources), and so forth.

Moreover, the secure enclave 140 may contain interfaces to aid in the initial development and debugging of the secure enclave 140 (in the pre-production mode of the secure enclave 140) but may be disabled completely or may have changed functions (for the production mode of the secure enclave 140) when certain fuses (e.g., certain OTP fuses 258) are blown. For example, these interfaces may include a Universal Asynchronous Receiver/Transmitter (UART) 262 that may be used for the debugging and development of the secure enclave 140 and then secured to a transmit only configuration for the production mode of the secure enclave 140. As an example, in accordance with some implementations, the UART 262 may be configured by the OTP fuses 258 to, in the production mode of the secure enclave 140, provide one-way status health information from the secure enclave 140. As another example, in accordance with further implementations, the OTP fuses 258 may disable the UART 262 for the production mode so that all communication with the UART 262 is disabled to prevent all communication across the cryptographic boundary 204. As another example of an interface that may aid in the initial development and debugging of the secure enclave 140 but may be modified/disabled for the production mode, the secure enclave 140 may include a Joint Test Action Group (JTAG) interface (not shown) for the security processor; and this JTAG interface may be disabled for the production mode of the secure enclave 140.

Figure 3:
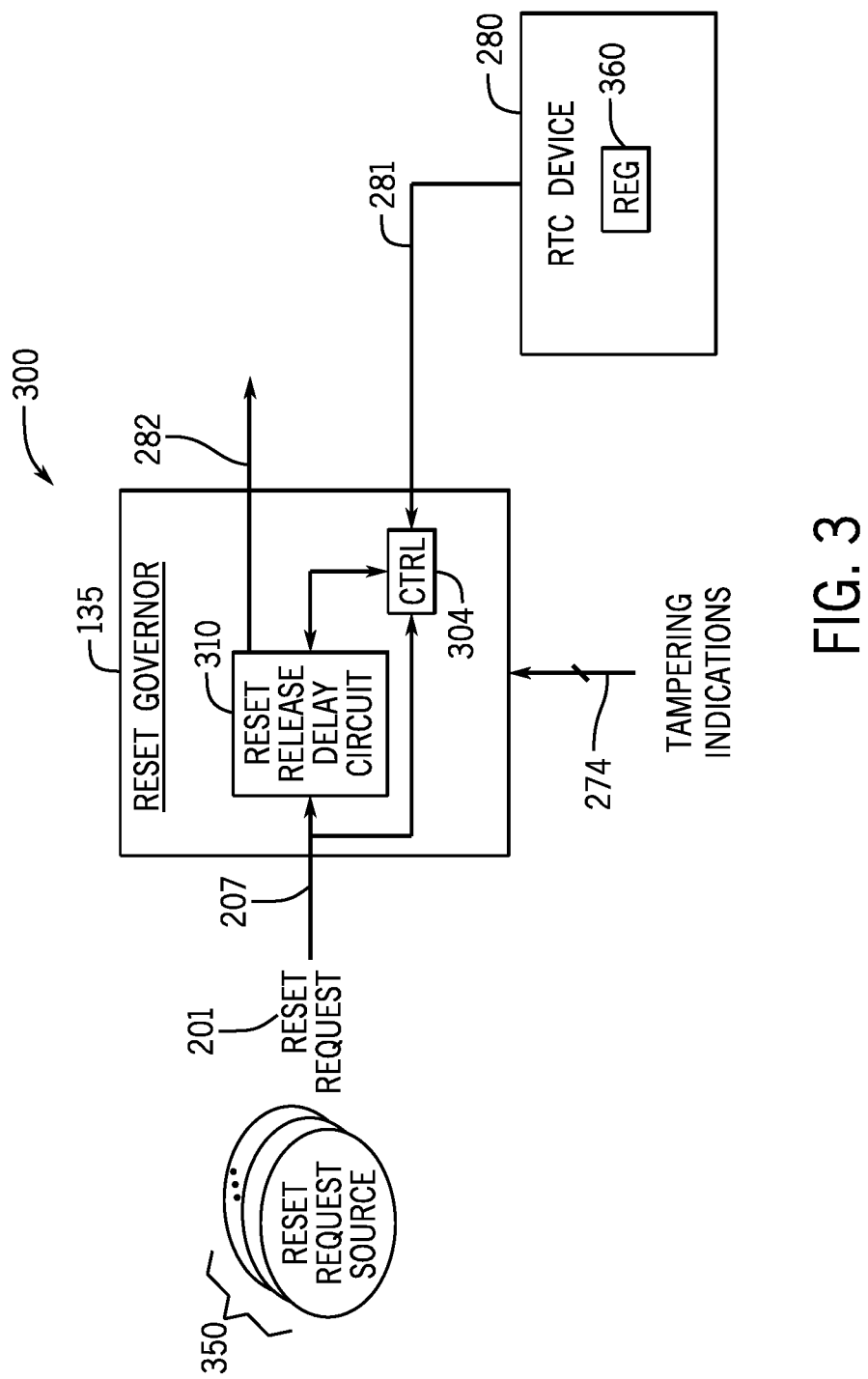
FIG. 3 is a block diagram of the reset governor according to an example implementation.

FIG. 3 depicts a subsystem 300 of the secure enclave 140, which governs the response of the secure enclave 140 to reset requests 201, in accordance with example implementations. Referring to FIG. 3, in accordance with example implementations, the subsystem 300 includes the reset governor 135 and the RTC device 280. In accordance with example implementations, the reset governor 135 receives reset requests 201 from one or multiple reset request sources 350. A given reset request source 350 may be external to or internal to the security processor 130 (FIG. 1). In accordance with some implementations, a reset request source 350 may correspond to a power cycle of the computer platform.

As an example, a reset request source 350 may be a power monitoring circuit. As another example, in accordance with some implementations, a reset request source 350 may be a circuit that generate a reset request 201 responsive to the security processing core 142 (FIG. 2) writing to a reset bit of a control register. As another example, in accordance with some implementations, a reset request source 350 may be a watchdog timer. A reset request source 350 may potentially be affiliated with a rogue entity for purposes of generating reset requests 201 as part of a security attack. A reset request source 350 may be a circuit of the security processor 130 (FIG. 1), BMC 129 (FIG. 1) or computer platform 100 (FIG. 1) but may be manipulated by a rogue entity for purposes of generating reset requests 201 as part of a security attack.

As depicted in FIG. 3, in accordance with some implementations, the reset governor 135 includes a reset release delay circuit 310 and a controller 304. The reset release delay circuit 310, in accordance with example implementations, passes through the assertion of the input reset signal (received at input 207) to the output reset signal (provided at output 282). Stated differently, in accordance with example implementations, the reset release delay circuit 310 imposes a small to no delay in asserting the output reset signal after the input reset signal is asserted. In accordance with example implementations, the edge of the input reset signal that is associated with the assertion (e.g., the positive going edge) triggers the reset governor 135 to measure a reset hold time, i.e., measure the time that elapses before the reset governor 135 deasserts the output reset signal to release the reset.

More specifically, in accordance with some implementations, responsive to the assertion of the input reset signal, the controller 304 writes data representing a time value to an alarm timer register 360 of the RTC device 280. The time value represents a future RTC time, which is offset from the current RTC time by the reset hold time. The RTC device 280, in this manner, measures the reset hold time and generates an indication (e.g., asserts an interrupt signal) to represent that the reset hold time has elapsed. The reset release delay circuit 310, in accordance with example implementations, waits for the RTC device 280 to generate the indication that represents the measurement of the reset hold time. In response to the RTC device 280 generating the indication, the reset release delay circuit 310 asserts the output reset signal on the output 282 to release the reset.

The controller 304, in accordance with example implementations, may regulate the reset hold time (and therefore, correspondingly write the appropriate value to the alarm time register) based on whether tampering activity has been detected. For example, when no tampering activity has been detected, the controller 304 may write data to the alarm register of the RTC device 280, which represents a time offset corresponding to a minimum reset hold time. When tampering activity has been detected, the controller 304 may write data to the alarm register of the RTC device 280, which represents a predefined longer reset hold time offset from the current time.

In accordance with some implementations, the controller 304 may regulate the reset hold time based on the type of detected tampering. For example, the controller 304 may impose a longer reset hold time responsive to an environmental condition-induced security attack than a reset hold time imposed for other types of tampering activities. Moreover, in accordance with some implementations, the controller 304 may upwardly adjust the reset hold time for certain type(s) of tampering (e.g., an environmental condition-induced security attack) but not for other types(s) of tampering (e.g., detected cover opening).

In accordance with some implementations, the controller 304 may impose more than two reset hold times. Moreover, the controller 304 may regulate the reset hold time based on a tampering activity detection history. For example, the controller 304 may impose a first reset hold time responsive to an initial detection of tampering activity, and the controller may impose a second reset hold time, greater than the first reset hold time, responsive to a subsequent detection of tampering activity.

The controller 304 may, from the perspective of the reset governor 135, reset the tampering history in accordance with some implementations. For example, the controller 304 may store a tampering activity detection history for the reset governor 135 in non-volatile memory, regulate the reset hold time based on this history, and after a predetermined time has elapsed without any tampering activity (relevant to the reset governor 135) being detected, clear the tampering activity detection history. In accordance with further implementations, the controller 304 does clear the tampering activity detection history, regardless of the time elapsed since tampering was last detected.

In accordance with example implementations, the controller 304 may be formed from one or multiple hardware processing cores that execute machine-executable instructions for purposes of performing the functions of the reset governor 135, as described herein. In accordance with further implementations, all or part of the reset governor 135 may be performed from dedicated hardware (e.g., logic gates) that performs one or multiple functions for the reset governor 135 without executing machine-executable instructions. In this manner, this hardware may, depending on the particular implementation, be an application specific integrated circuit (ASIC), a field programmable gate array (FPGA), a complex programmable logic device (CPLD), and so forth.

In accordance with some implementations, the reset release delay circuit 310 may be logic, such as combinatorial logic gates and flip-flops. In accordance with further implementations, the operation of the reset release delay circuit 310 may not depend on an RTC device. For example, in accordance with some implementations, the reset release delay circuit 310 may measure the reset hold time using a chain of serially coupled delay elements, and the controller 304 may control the number of delay elements of the chain to regulate the reset hold time. As another example, in accordance with further implementations, the reset release delay element may include a timer circuit or other delay element to measure the reset hold time.

Figure 4:
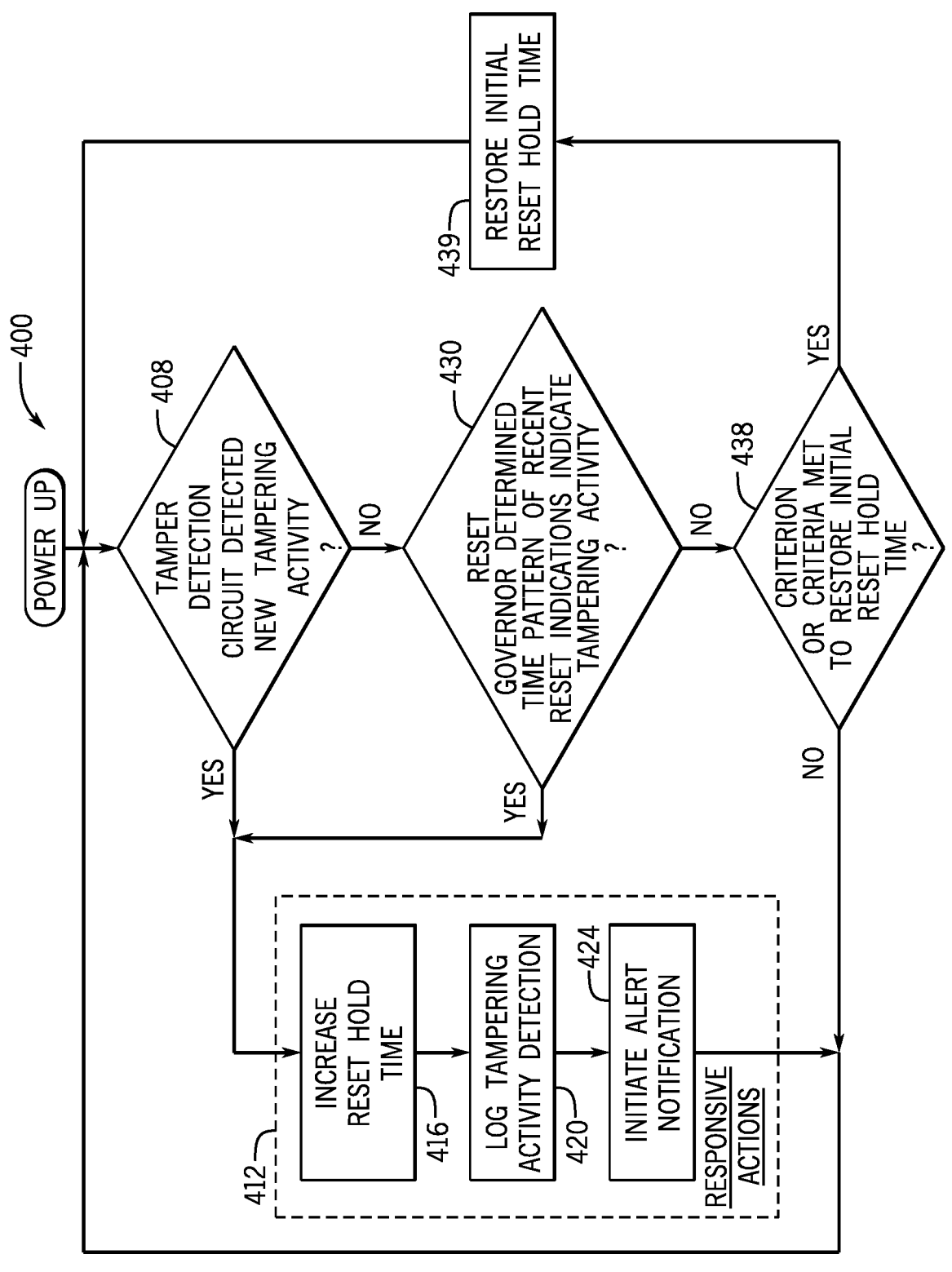
FIG. 4 is a flow diagram depicting a process performed by the security processor to regulate a response of the security processor to a reset request according to an example implementation.

FIG. 4 depicts an example process 400 that may be performed by the security processor 130 (FIG. 1) to control the security processor's reset response in accordance with example implementations. The process 400 may involve a number of components of the security processor 130 taking action, such as the reset governor 135 (FIGS. 2 and 3), the tampering detection circuit 234 (FIG. 2), the canary circuit(s) 134 (FIG. 2), and the RTC device 280 (FIG. 2), as described herein.

Referring to FIG. 4, in accordance with example implementations, the process 400 begins at power-up and includes determining (pursuant to decision block 408) if the tampering detection circuit has detected new tampering activity, and if so, performing one or multiple responsive actions (as depicted at 412) to the tampering activity. More specifically, in accordance with example implementations, performing the responsive actions 412 may include increasing the reset hold time, pursuant to block 416, and logging the tampering activity detection, pursuant to block 420. Moreover, as also depicted in FIG. 4, in accordance with some implementations, performing the responsive actions 412 may include initiating (block 424) an alert notification (e.g., notifying a management processing core 154 of the BMC 129 or notifying the remote management server 190 (FIG. 1) of the tampering activity detection).

The process 400 further includes determining, pursuant to decision block 430, whether the time pattern of recent reset indications indicate tampering activity. If so, then, in accordance with example implementations, control proceeds to block 412 for purposes of performing responsive actions. Otherwise, pursuant to the process 400, if no new tampering activity has been detected, the process 400 includes determining (decision block 438) whether a predefined criterion or criteria have been met for restoring an initial reset hold time (e.g., a predefined minimum reset hold time). As an example, in accordance with some implementations, after a predetermined time period has elapsed, the process 400 may include the reset governor restoring (block 439) an initial reset hold time.

In accordance with example implementations, one or multiple canary circuits may be disposed near respective components of a security processor to be protected. For example, in accordance with some implementations, a canary circuit may be disposed near an SRoT engine, and another canary circuit may be disposed near a security processing core of the security processor.

Figures 5, 6:
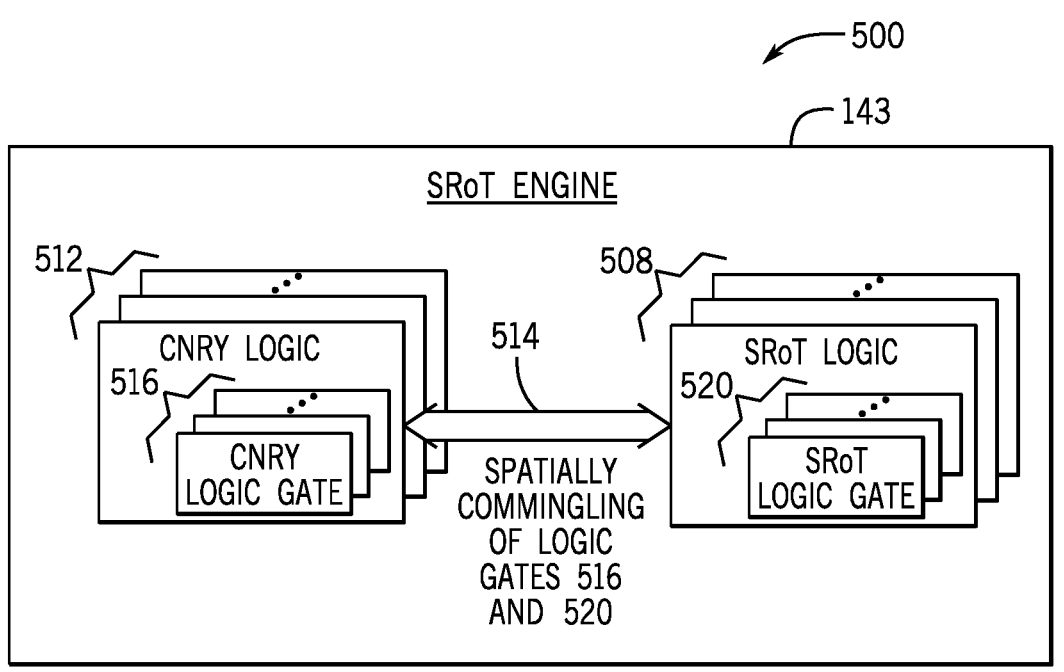
FIG. 5 depicts a silicon root-of-trust engine (SRoT) engine of the security processor, illustrating the incorporation of a digital canary circuit in the SRoT engine according to an example implementation.
FIG. 6 is an illustration of the spatial commingling of root-of-trust engine logic gates and canary circuit logic gates according to an example implementation.

In accordance with further implementations, subcomponents of the component to be protected may be spatially commingled with components of the associated canary circuit. For example, in accordance with some implementations, components of a canary circuit may be spatially commingled with components of an SRoT engine. Referring to FIG. 5, as a more specific example, in accordance with some implementations, the SRoT engine 143 may include SRoT logic elements 508. In the context used herein, a "logic element" refers to a circuit that is formed from a set of logic gates. As depicted in FIG. 5, a logic element 508 may include one or multiple logic gates 520 (called "SRoT logic gates 520" herein). As examples, an SRoT logic gate 520 may be a combinatorial logic gate, such as an AND gate, an OR gate, a NAND gate, a NOT gate, a NOR gates, an XOR gate, or, in general, a device that applies a Boolean algebra expression to one or multiple Boolean input to provide a Boolean output in accordance with the Boolean algebra expression. As examples, an SRoT logic element 508 may be a flip-flop, a register, a counter, a timer, a delay circuit, a comparison circuits, a circuit to implement a state of a state machine, or in general, a set of logic gates that perform a function for the SRoT engine 143.

The SRoT engine 143 may further include canary logic elements 512 of a canary circuit. Each canary logic element 512 may include one or multiple logic gates 516 (called "canary logic gates 516" herein), which may be combinatorial logic gates. As examples, a canary logic element 512 may be a flip-flop, a register, a counter, a timer, a delay circuit, a comparison circuits, a circuit to implement a state of a state machine, a circuit to perform an encryption cipher (e.g., an AES cipher block), or in general, a set of logic gates that perform a function for the canary circuit.

As depicted at reference numeral 514 of FIG. 5, in accordance with example implementations, the canary logic gates 516 may be spatially commingled with the SRoT logic gates 520. In this context, the "spatial commingling" of the logic gates 516 and 520 refers to collocating the logic gates 516 and 520 in a region of a semiconductor die such that in the region, logic gates 516 and 520 are commingled, or mixed, along a first path that is parallel to a first dimension axis and logic gates 516 and 520 are also commingled, or mixed, along a second path that is parallel to a second dimension axis that is orthogonal to the first dimension axis. Due to the spatial commingling of the canary logic gates 516 with the SRoT logic gates 520, the canary logic gates 516 experience all or multiple of the same environmental conditions as the SRoT gates 520. Therefore, a canary circuit formed from the canary logic gates 516 may accurately sense environmental conditions of the SRoT engine 143 and rapidly provide an indication of an environmental condition induced security attack that affects the SRoT engine 143.

FIG. 6 depicts an example semiconductor die region 600, in accordance with an example implementation. In accordance with some implementations, the semiconductor die region 600 corresponds to a region of a semiconductor die 157 (FIG. 1) in which the SRoT engine 143 is partially or wholly fabricated. It is noted that SRoT engine 143 may further be fabricated in one or multiple other regions of the semiconductor die 157.

Referring to FIG. 6, the semiconductor die region 600 extends laterally over a semiconductor die along X and Y dimensions, corresponding to an X axis 602 and a Y axis 601, respectively. The semiconductor die has a thickness Z dimension that corresponds to a Z axis 603. The Z axis 603 extends along a direction that is aligned with the surface normal of the wafer from which the die originates.

For the particular example implementation that is depicted in FIG. 6, the spatial commingling is along both the X and Y dimensions. More specifically, in the region 600, SRoT logic gates 520 (e.g., SRoT logic gates 520-1, 520-2, 520-3 and 520-4) and canary logic gates 516 (e.g., canary logic gates 516-1, 516-3 and 516-3) are commingled along a first path 650 that is parallel to the Y axis 601. Also in the region 600, SRoT logic gates 520 (e.g., SRoT logic gates 520-3, 520-5 and 520-6) and canary logic gates 516 (e.g., canary logic gates 516-1, 516-2, 516-4 and 516-5) are commingled along a second path 654 that is parallel to the X axis 602 (which is orthogonal to the Y axis 601).

For this example implementation, the canary logic gates 516 and SRoT logic gates 520 may be spatially commingled through the use of a layout design tool that is used to place the transistors, metal interconnects and other features of the semiconductor die. For example, user input to the layout design tool may specify boundaries of a first X-Y window for the canary logic gates 516 and further specify boundaries of a second X-Y window for the SRoT logic gates 520, which overlaps at least in part with the first X-Y window. For example, the first X-Y window may be specified for a cell that corresponds to a canary circuit, and the second X-Y window may be specified for a cell that corresponds to an SRoT engine. The layout design tool may place the transistors, interconnects and other features of the canary circuit and SRoT engine in the semiconductor die corresponding to the first and second X-Y windows according to placement rules, and generate a file containing data that describes the layout.

As another example, in accordance with some implementations, user input may be provided to a layout design tool to specify specific locations for the canary logic gates 516 and SRoT logic gates 520 in a manner that spatially commingles the gates 516 and 520 along one or multiple dimensions of the semiconductor die. As another example, in accordance with some implementations, user input may be provided to a layout design tool to specify specific locations for transistors of the canary logic gates 516 and SRoT logic gates 520 in a manner that spatially commingles the transistors (and therefore spatially commingles the gates 516 and 520) along one or multiple dimensions of the semiconductor die.

In accordance with further implementations, the spatially commingling of the canary logic gates 516 and SRoT gates 520 may extend along the Z axis 603.

Figures 7, 8:
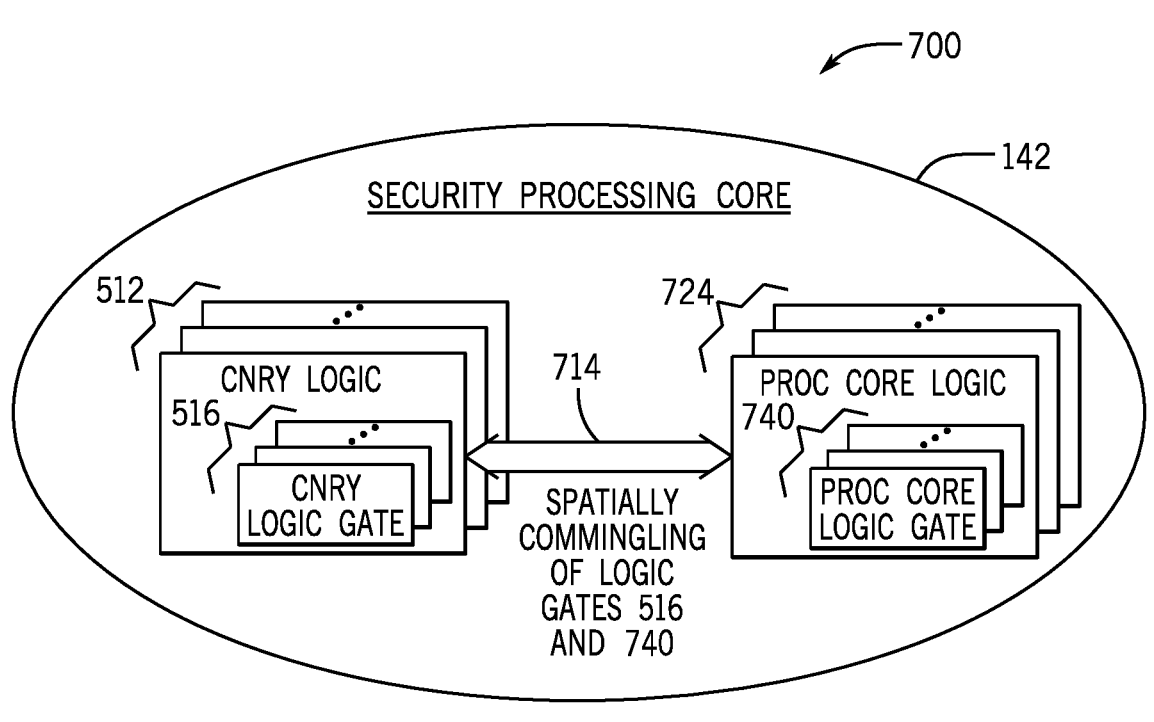
FIG. 7 depicts a processing core of the security processor, illustrating the incorporation of a digital canary circuit in the processing core according to an example implementation.
FIG. 8 is an illustration of the spatial commingling of processing core logic gates and canary circuit logic gates according to an example implementation.

As another example, in accordance with some implementations, components of a canary circuit may be spatially commingled with components of a security processing core. Referring to FIG. 7, in accordance with some implementations, the security processing core 142 may include processing core logic elements 724, and as depicted in FIG. 7, a logic element 724 may include one or multiple logic gates 740 (called "processing core gates 740" herein), which may be combinatorial logic gates. As examples, a processing core logic element 724 may be a flip-flop, a register, a counter, a timer, a delay circuit, a comparison circuit, a circuit to implement a state of a state machine, or in general, a set of logic gates that perform a function for the security processing core 142. In accordance with an example implementation, a given processing core logic element 724 may form all or part of an arithmetic logic unit, a control unit, a cache, a register, an execution unit, instruction fetching unit, a memory management unit, or other component of the security processing unit 142.

As depicted in FIG. 7, the security processing core 142 may further include canary logic elements 512, and each canary logic element 512 may include one or multiple canary logic gates 516. As depicted at reference numeral 714 of FIG. 7, in accordance with example implementations, the canary logic gates 516 may be spatially commingled with the processing core logic gates 740. Due to the spatial commingling of the canary logic gates 516 with the processing core logic gates 740, the canary logic gates 516 experience all or multiple of the same environmental conditions as the processing core logic gates 740. Therefore, a canary circuit formed from the canary logic gates 516 may accurately sense environmental conditions of the security processing core 142 and rapidly provide an indication of an environmental condition induced security attack that affects the security processing core 142.

FIG. 8 depicts an example semiconductor die region 800, in accordance with an example implementation. In accordance with some implementations, the semiconductor die region 800 corresponds to a region of a semiconductor die 157 (FIG. 1) in which the security processing core 142 is partially or wholly fabricated. It is noted that the security processing core 142 may further be fabricated in one or multiple other regions of the semiconductor die 157.

Referring to FIG. 8, the semiconductor die region 800 extends laterally over a semiconductor die in an X dimension and a Y dimension that corresponds to an X axis 802 and a Y axis 801, respectively. The semiconductor die has a thickness Z dimension that extends along a Z axis 803. In accordance with example implementations, the spatial commingling of the canary logic gates 516 and the security processing core logic gates 740 may occur along the X and Y dimensions. In accordance with some implementations, the spatial commingling may extend along the Z dimension. The spatial commingling may be established using a layout design tool, as described herein in the discussion of the spatial commingling of canary logic gates and SRoT logic gates.

Figure 9:
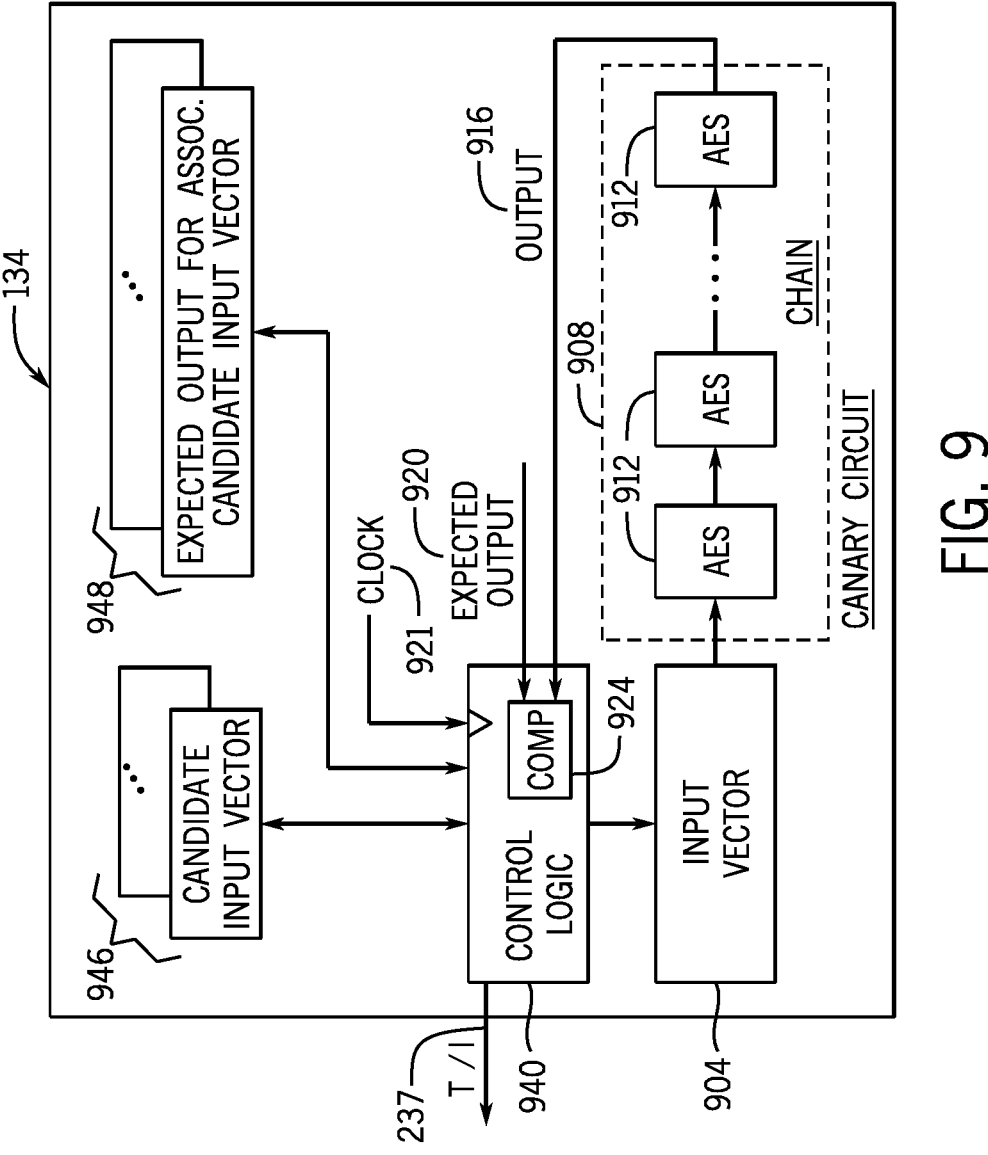
FIG. 9 is a block diagram of a digital canary circuit according to an example implementation.

Referring to FIG. 9, in accordance with some implementations, the canary circuit 134 may include a chain 908 of cryptographic processing stages 912. In accordance with example implementations, each stage 912 may correspond to an instance of a cryptographic cipher block, or transform. For example, as depicted in FIG. 9, in accordance with some implementations, the stage 912 may correspond to an Advanced Encryption System (AES) cipher, or transform, and may correspond to a particular AES iteration. In accordance with example implementations, a particular stage 912 may be implemented by a set of combinatorial logic, or logic cone. In general, in accordance with example implementations, the logic cone is constructed so that the canary circuit 134 just meets timing within a given clock cycle (e.g., the canary circuit 134 does not meet timing within a clock cycle if an environmental condition-induced security attack occurs).

In accordance with example implementations, the canary circuit 134 performs a number of AES transform iterations (via corresponding stages 912) in a single cycle of a clock signal 921. More specifically, the clock signal 921 may, in accordance with some implementations, be the same clock signal that clocks operations of the security processing core 142 (FIG. 2) and/or SRoT engine 143 (FIG. 2). The canary circuit 134, in accordance with example implementations, generates the output 916 for each cycle of the clock signal 921. Stated differently, in accordance with example implementations, in a single clock cycle, the chain 908 receives an input, or input vector 904, and performs multiple AES transform iterations (via respective stages 912) to produce an output 916.

In accordance with example implementations, if the canary circuit 134 is operating properly and is not malfunctioning (e.g., malfunctioning due to an environmentally-induced condition), then the chain 908 produces an output 916, which corresponds to an expected output 920. Otherwise, the output 916 does not match the expected output 920, and this mismatch causes the canary circuit 134 to provide an indication of detected tampering activity (e.g., indicate detection of an environmental condition-induced security attack).

As depicted in FIG. 9, in accordance with some implementations, control logic 940 of the canary circuit 134 includes a comparator 924 that compares the output 916 of the chain 908 to an expected output 920. If these outputs do not match, then, in accordance with example implementations, the comparator 924 provides a tampering indication to an output 237 of the canary circuit 134 (e.g., the comparator 924 asserts a tampering indication signal to alert the tampering detection circuit 234 (FIG. 2) to the detection of tampering activity).

Due to the nature of the AES transform, a single logical value change corresponding to the transform may result in multiple bits changing in the output of the transform. Therefore, the use of the AES transform and in particular, the use of multiple, cascaded AES transforms, amplifies the malfunction indicator (the difference between the output 916 and the expected output 920) and correspondingly causes the canary circuit 134 to be highly sensitive to an environmental condition-induced security attack.

In accordance with some implementations, due to the complex nature of the logic (e.g., the AES stages 912) of the canary circuit 134, the propagation of the input vector 904 through all of the transforms (e.g., AES transforms) consumes a significant portion (e.g., 80 to 90 percent or a higher percentage) of the clock cycle. For example, in accordance with example implementations, the number of AES stages 912 of the chain 908 may be tuned so that the chain 908 barely meets timing specifications during a single clock cycle. For example, taking into account fabrication variations, the number of AES stages 912 for the expected slowest silicon may be selected to furnish the output 916 at the end of the clock cycle. In accordance with example implementations, the canary circuit 134 is purposefully tuned by design to be the first, if not one of the first, circuits of the security processor 130 to malfunction (e.g., the output 916 does not match the expected output 920) in the event of an environmental condition-induced security attack.

The control logic 940, in accordance with example implementations, is constructed to sample the output 916 for each cycle of the clock signal 921. For example, in accordance with example implementations, the control logic 940 may provide the input vector 904 to the chain 908 responsive to particular edges (e.g., positive going, or rising, edges) of the clock signal 921, and the comparator 924 may sample the output 916 on particular edges (e.g., rising edges) of the clock signal 921. Therefore, in accordance with some implementations, the transformations begin at the beginning of clock cycles, and the result of the transformations are sampled at the end of clock cycles.

For purposes of refreshing the logic gates of the canary circuit 134 for each clock cycle so that the logic gates will transition during the clock cycle (and not remain static), the control logic 940 provides different input vectors 904 to the chain 908 on alternate clock cycles. In this manner, as depicted in FIG. 9, in accordance with some implementations, the control logic 940 may select a particular candidate input vector 946 to be the input vector 904 for clock cycle A. The candidate input vector 946 has a corresponding expected output 948, which the control logic 940 compares to the output 916 at the end of clock cycle A. For the next successive clock cycle B, the control logic 940 may select another candidate input vector 946 to be the input vector 904 for clock cycle B. This other candidate input vector 946 has a corresponding output 948, which the control logic 940 compares to the output 916 at the end of clock cycle B.

In accordance with some implementations, the control logic 940 may alternate between providing two different input vectors to the chain 908 for respective alternate clock cycles. In accordance with further implementations, the control logic 940 may alternate between more than two input vectors. In accordance with further implementations, the same input vector may be provided to the chain 908 for each clock cycle.

Figure 10:
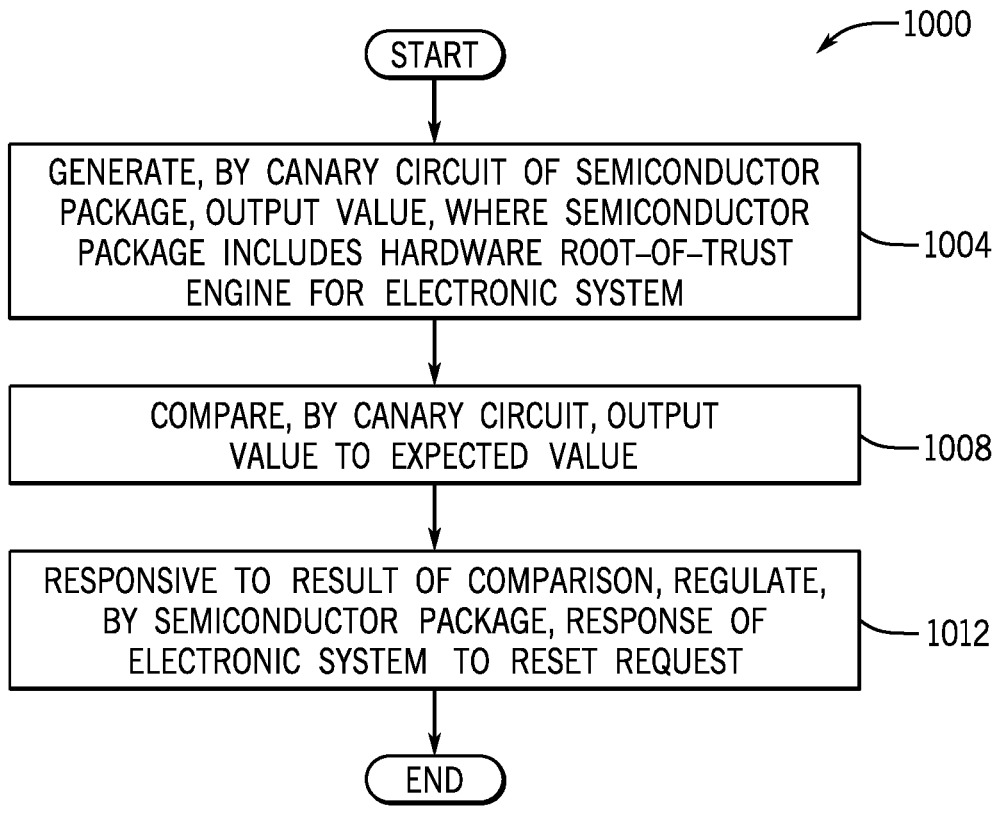
FIG. 10 is a flow diagram of a process to detect and respond to tampering activity according to an example implementation.

Referring to FIG. 10, in accordance with example implementations, a process 1000 includes generating (block 1004), by a canary circuit of a semiconductor package, an output value. The semiconductor package includes a hardware root-of-trust engine for an electronic system. In accordance with example implementations, the semiconductor package may be associated with a management controller, such as the BMC 129 (FIG. 1). In accordance with some implementations, the semiconductor package may include a security processor 130 (FIGS. 1 and 2), and the electronic system may be a computer platform 100 (FIG. 1). The canary circuit may include logic, such as a chain of stages that correspond to AES cryptographic cipher transforms, and the number of the stage may be tuned to impart a high sensitivity of the canary circuit to an environmental condition-induced security attack. The process 1000 includes comparing (block 1008), by the canary circuit, the output value to an expected value. In accordance with example implementations, the comparison may be performed each clock cycle. Moreover, in accordance with example implementations, logic of the canary circuit may be provided different input values on alternate clock cycles to refresh the logic gates for each clock cycle. The process 1000 includes, responsive to a result of the comparison, regulating (block 1012), by the semiconductor package, a response of the electronic system to a reset request. In accordance with some implementations, regulating the response of the electronic system to the reset request incudes regulating a reset response of the semiconductor package. In accordance with some implementations, regulating the response of the electronic system to the reset request includes regulating a reset response of a subsystem (e.g., a management subsystem) of the electronic system. In accordance with some implementations, regulating the response of the electronic system to the reset request includes regulating a reset response of a component (e.g., a management controller or a baseboard management controller of the electronic system) of the electronic system, which may or may not include the semiconductor package.

The reset request may be a state (e.g., a state corresponding to a logic zero) of an electrical signal, in accordance with example implementations. The reset request may be generated outside of the semiconductor package, may be generated inside the semiconductor package, may be generated by a circuit, and may be generated responsive to the execution of machine-readable instructions. In accordance with example implementations, regulating the response of the semiconductor package to a reset request includes regulating a reset hold time.

Figure 11:
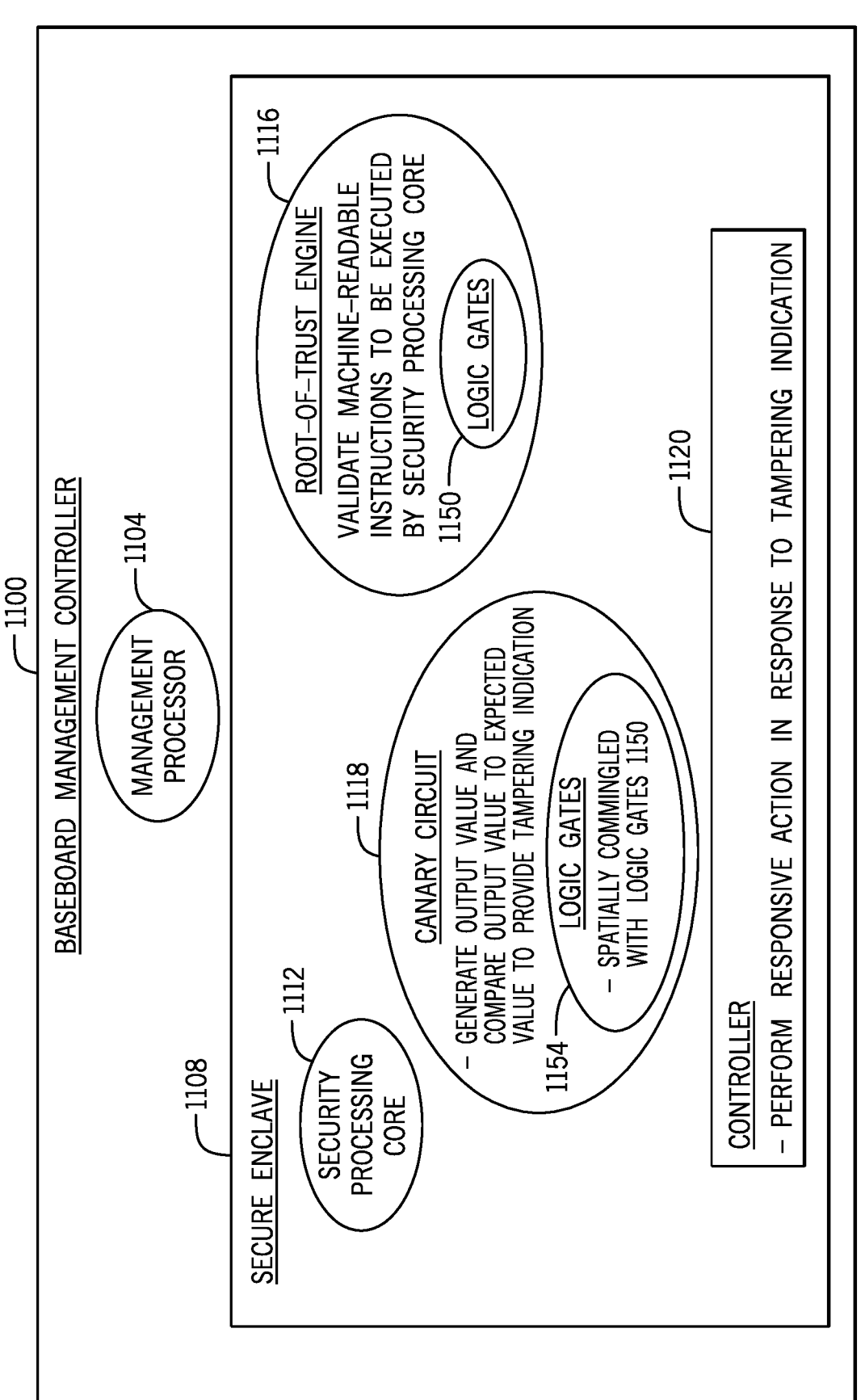
FIG. 11 is a block diagram of a baseboard management controller (BMC) having a canary circuit to detect tampering and a controller to perform a responsive action responsive to detected tampering according to an example implementation.

Referring to FIG. 11, in accordance with example implementations, a baseboard management controller 1100 includes a management processor 1104 and a secure enclave 1108. In accordance with some implementations, the baseboard management controller 1100 may provide management services and security services for a host. In accordance with example implementations, the management processor 1104 may be a processing core 154 (FIG. 1) that executes management stack firmware to provide management services for a host. The secure enclave 1108 has an associated cryptographic boundary and includes a security processing core 1112; a root-of-trust engine 1116; a canary circuit 1118; and a controller 1120. The canary circuit 1118 may include logic, such as a chain of stages that correspond to cryptographic cipher transforms (e.g., AES transforms), and the number of the stage may be tuned to impart a high sensitivity of the canary circuit 1118 to an environmental condition-induced security attack. The root-of-trust engine 1116 validates machine-readable instructions to be executed by the security processing core 1112. The root-of-trust engine 1116 includes logic gates 1150, and the canary circuit 1118 includes logic gates 1154 that are spatially commingled with the logic gates 1150. The canary circuit 118 generates an output value and compares the output value to an expected value to provide a tampering indication. The controller 1120 performs a responsive action in response to the tampering indication. In accordance with some implementations, performing the responsive action may include regulating a reset hold time.

Figure 12:
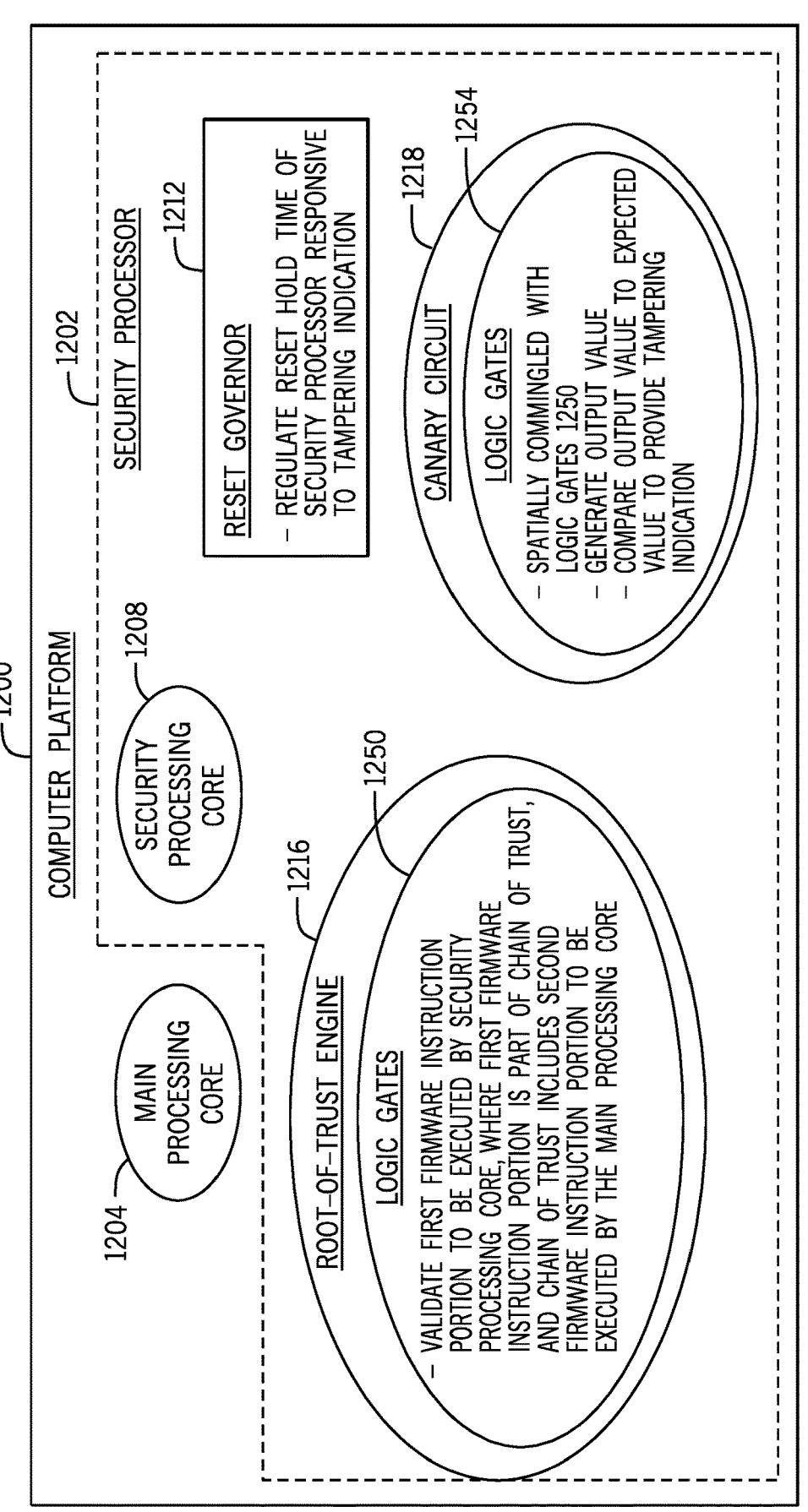
FIG. 12 is a block diagram of a computer platform having a canary circuit to detect tampering and a reset governor to regulate a reset hold time responsive to detected tampering according to an example implementation.

Referring to FIG. 12, in accordance with example implementations, a computer platform 1200 includes a main processing core 1204 and a security processor 1202. The main CPU processing core 102 (FIG. 1) and the secure enclave 140 (FIG. 1) are examples of the main processing core 1204 and the security processor 1202, in accordance with some implementations. The security processor 1202 includes a security processing core 1208; a root-of-trust engine 1216; a canary circuit 1218; and a reset governor 1212. The first firmware instruction portion is part of a chain of trust, and the chain of trust includes a second firmware instruction portion to be executed by the main processing core 1204. In accordance with example implementations, the security processor 1202 may be a management controller, such as a BMC 129 (FIG. 1), which provides management services and security services for a host 101. The canary circuit 1218 may include logic, such as a chain of stages that correspond to cryptographic cipher transforms (e.g., AES transforms), and the number of the stage may be tuned to impart a high sensitivity of the canary circuit 1218 to an environmental condition-induced security attack. The root-of-trust engine 1216 includes a first plurality of logic gates 1250 to validate a first firmware instruction portion to be executed by the security processing core 1208. The canary circuit 1218 includes a second plurality of logic gates 1254 to generate an output value and compare the output value to an expected value to provide a tampering indication. The logic gates 1254 are spatially commingled with the logic gates 1250. The reset governor 1212 regulates a reset hold time of the security processor 1202 responsive to the tampering indication.

In accordance with example implementations, generating the output value includes providing an input to a chain of serially-coupled stages to cause the chain to provide the output value. Each stage of the chain is associated with a cryptographic transform. A particular advantage is that the canary circuit accurately senses environmental conditions of the component to be protected for purposes of rapidly detecting and responding to environmental condition-induced security attacks.

In accordance with implementations, generating the output includes providing an input to a chain of serially-coupled Advanced Encryption Standard (AES) block cipher transform stages or a chain of serially-coupled Standard Hash Algorithm-3 (SHA-3) block cipher transform stages to cause the chain to provide the output value. A particular advantage is that the canary circuit accurately senses environmental conditions of the component to be protected for purposes of rapidly detecting and responding to environmental condition-induced security attacks.

In accordance with example implementations, the process includes providing a clock signal to a processing core of the semiconductor package. The clock signal has a clock, and generating the output value includes performing the generation within a time less than the clock. A particular advantage is that the canary circuit accurately senses environmental conditions of the component to be protected for purposes of rapidly detecting and responding to environmental condition-induced security attacks.

In accordance with example implementations, generating the output includes providing an input to logic of the canary circuit; and using the logic to generate the output for each cycle of a plurality of cycles of a clock signal. Generating the output includes varying the input over the plurality of cycles, and varying the expected value over the plurality of cycles corresponding to the variation of the input. A particular advantage is that the canary circuit accurately senses environmental conditions of the component to be protected for purposes of rapidly detecting and responding to environmental condition-induced security attacks.

In accordance with example implementations, the process further includes, responsive to the reset request, placing the hardware root-of-trust engine in reset. Regulating the response of the semiconductor package to the reset signal includes regulating a delay between a first time that the hardware root-of-trust engine is placed in the reset and a second time that the hardware root-of-trust engine is released from the reset. A particular advantage is that the canary circuit accurately senses environmental conditions of the component to be protected for purposes of rapidly detecting and responding to environmental condition-induced security attacks.

In accordance with example implementations, generating the output value includes providing an input to logic gates of the canary circuit. The logic gates of the canary circuit are spatially commingled with logic gates of the hardware root-of-trust engine. The logic gates of the canary circuit are used to generate the output. A particular advantage is that the canary circuit accurately senses environmental conditions of the component to be protected for purposes of rapidly detecting and responding to environmental condition-induced security attacks.

In accordance with example implementations, generating the output value includes providing an input to logic gates of the canary circuit. The logic gates of the canary circuit are spatially commingled with logic gates of a security processing core of the semiconductor package. The logic gates of the canary circuit are used to generate the output. A particular advantage is that the canary circuit accurately senses environmental conditions of the component to be protected for purposes of rapidly detecting and responding to environmental condition-induced security attacks.

In accordance with example implementations, the process includes a processing core of a security processor of the semiconductor package executing machine-readable instructions to provide a security service for the electronic system. The canary circuit malfunctions due to an environmental condition-induced security attack on the semiconductor package. The malfunctioning includes the comparison providing a result that represents that the output value does not correspond to the expected value. Regulating the response of the semiconductor package to the reset signal includes increasing a reset hold time for the semiconductor package responsive to the result of the comparison. A particular advantage is that the canary circuit accurately senses environmental conditions of the component to be protected for purposes of rapidly detecting and responding to environmental condition-induced security attacks.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

generating, by a canary circuit of a semiconductor package, an output value, wherein the semiconductor package comprises a hardware root-of-trust engine for an electronic system;

comparing, by the canary circuit, the output value to an expected value;

receiving, by the electronic system, a reset request directed to placing a component of the electronic system in a reset state; and responsive to a result of the comparison, regulating, by the semiconductor package, a response of the electronic system to the reset request.

2. The method of claim 1, wherein generating the output value comprises:

providing an input to a chain of serially-coupled stages to cause the chain to provide the output value, wherein each stage of the chain is associated with a cryptographic transform.

3. The method of claim 1, wherein generating the output comprises:

providing an input to a chain of serially-coupled Advanced Encryption Standard (AES) block cipher transform stages or a chain of serially-coupled Secure Hash Algorithm-3 (SHA-3) block cipher transform stages to cause the chain to provide the output value.

4. The method of claim 1, further comprising providing a clock signal to a processing core of the semiconductor package, wherein:

the clock signal has a clock period; and generating the output value comprises performing the generation within a time less than the clock period.

5. The method of claim 1, wherein generating the output comprises:

providing an input to logic of the canary circuit;

using the logic to generate the output for each cycle of a plurality of cycles of a clock signal;

varying the input over the plurality of cycles; and varying the expected value over the plurality of cycles corresponding to the variation of the input.

6. The method of claim 1, further comprising:

responsive to the reset request, placing the hardware root-of-trust engine in a reset, wherein regulating the response of the semiconductor package to the reset signal comprises regulating a delay between a first time that the hardware root-of-trust engine is placed in the reset and a second time that the hardware root-of-trust engine is released from the reset.

7. The method of claim 1, wherein generating the output value comprises:

providing an input to logic gates of the canary circuit, wherein the logic gates of the canary circuit are spatially commingled with logic gates of the hardware root-of-trust engine; and using the logic gates of the canary circuit to generate the output.

8. The method of claim 1, wherein generating the output value comprises:

providing an input to logic gates of the canary circuit, wherein the logic gates of the canary circuit are spatially commingled with logic gates of a security processing core of the semiconductor package; and using the logic gates of the canary circuit to generate the output.

9. The method of claim 1, further comprising:

a processing core of a security processor of the semiconductor package executing machine-readable instructions to provide a security service for the electronic system; and the canary circuit malfunctioning due to an environmental condition-based security attack on the semiconductor package, wherein the malfunctioning comprises the comparing providing a result representing that the output value does not correspond to the expected value, wherein regulating the response of the semiconductor package to the reset signal comprises increasing a reset hold time for the semiconductor package responsive to the result.

10. A baseboard management controller comprising:

a management processor; and a secure enclave separate from the management processor, wherein the secure enclave has an associated cryptographic boundary and comprises:

a security processing core;

a root-of-trust engine to validate machine-readable instructions to be executed by the security processing core, wherein the root-of-trust engine comprises a first plurality of logic gates;

a canary circuit comprising a second plurality of logic gates spatially commingled with the first plurality of logic gates, wherein the canary circuit to detect tampering with the secure enclave, wherein detection of the tampering comprises generating, by the canary circuit, an output value and comparing, by the canary circuit, the output value to an expected value to provide a tampering indication; and a controller to perform a responsive action in response to the tampering indication.

11. The baseboard management controller of claim 10, wherein the controller comprises a reset governor, and the reset governor to regulate a reset hold time of the secure enclave responsive to the tampering indication.

12. The baseboard management controller of claim 11, wherein the security processing core comprises a third plurality of logic gates, the baseboard management further comprising:

an additional canary circuit comprising a fourth plurality of logic gates, wherein the fourth plurality of logic gates are spatially commingled with the third plurality of logic gates, and the fourth plurality of logic gates to generate an additional output value and compare the additional output value to another expected value to provide a tampering indication, wherein the controller to perform a corrective action responsive to the tampering indication provided by the additional canary circuit.

13. The baseboard management controller of claim 11, wherein:

the security processing core comprises a semiconductor die having an associated first dimension corresponding to a first axis and an associated second dimension corresponding to a second axis, wherein the second axis is orthogonal to the first axis;

the logic gates of the first plurality are commingled along a first path parallel to the first axis; and the logic gates of the second plurality are commingled along a second path parallel to the second axis.

14. The baseboard management controller of claim 13, wherein the semiconductor die is associated with a third axis, the third axis is orthogonal to the first axis, the third axis is orthogonal to the second axis, and the third axis corresponds to a thickness dimension of the semiconductor die.

15. A computer platform comprising:

a main processing core; and a security processor comprising:

a security processing core;

a root-of-trust engine, wherein the root-of-trust engine comprises a first plurality of logic gates to validate a first firmware instruction portion to be executed by the security processing core, the first firmware instruction portion is part of a chain of trust, and the chain of trust includes a second firmware instruction portion to be executed by the main processing core; and a canary circuit comprising a second plurality of logic gates to generate an output value and compare the output value to an expected value to provide a tampering indication, wherein logic gates of the second plurality of logic gates are spatially commingled with logic gates of the first plurality of logic gates; and a reset governor to regulate a reset hold time of the security processor responsive to the tampering indication.

16. The computer platform of claim 15, wherein the root-of-trust engine comprises a reset input, and the reset governor to further:

receive a reset request;

responsive to the reset request, provide a signal to the reset input to place the root-of-trust engine in reset; and responsive to the tampering indication, relative the reset hold time to regulate a time that the root-of-trust engine is held in the reset before being released from the reset.

17. The computer platform of claim 15, wherein the canary circuit comprises:

a chain of serially-coupled cryptographic processing stages, wherein the chain to receive an input and provide the output value responsive to the input vector.

18. The computer platform of claim 17, wherein the canary circuit to generate the output for each cycle of a clock signal, and the canary circuit further comprises:

a controller to vary the input on alternate cycles of the clock signal.

19. The computer platform of claim 17, wherein each stage comprises logic to perform an Advanced Encryption Standard (AES) cipher block transformation or perform a Secure Hash Algorithm-3 (SHA-3) block cipher transformation.

20. The computer platform of claim 16, wherein the main processing core to provide a host instance, and the computer platform further comprising a management controller to provide a management service for the host instance, wherein the management controller comprises the security processor.

21. The method of claim 1, further comprising:

placing the component in the reset state; and releasing the component from the reset state, wherein regulating the response of the electronic system to the reset request comprises regulating a release of the component from the reset state.

22. The baseboard management controller of claim 10, wherein:

the root-of-trust engine is placed in a reset; and the controller to further, responsive to the tampering indication, regulate a delay between a first time that the root-of-trust engine is placed in the reset and a second time that the root-of-trust engine is released from the reset.

23. The computer platform of claim 15, wherein:

the security processor is placed in a reset; and the reset governor to further regulate a delay between a first time that the security processor is placed in the reset and a second time that the security processor is released from the reset.

* * * * *